US005341408A

United States Patent [19]

[11] Patent Number: 5,341,408

Melcher et al.

[45] Date of Patent: Aug. 23, 1994

[54] CONTROL SYSTEM FOR CURRENTY COUNTER

[75] Inventors: Richard A. Melcher, Croydon, Pa.; William Sherman, III, Medford; Madhura Nadig, Sewell, both of N.J.; Robert M. Stewart, Langhorne, Pa.; Paul L. Hessler, Oreland, Pa.; David R. Bryce, Morrissville, Pa.

[73] Assignee: Brandt, Inc., Bensalem, Pa.

[21] Appl. No.: 736,085

[22] Filed: Jul. 26, 1991

[51] Int. Cl.[5] .......... G06F 15/30

[52] U.S. Cl. .......... 377/8; 377/17; 235/379

[58] Field of Search .......... 377/8, 17; 235/379

[56] References Cited

U.S. PATENT DOCUMENTS

| | | | |
|---|---|---|---|
| 3,287,015 | 11/1966 | Preuss et al. | 271/57 |
| 3,749,395 | 7/1973 | Bazzarone et al. | 271/4 |
| 3,778,051 | 12/1973 | Allen et al. | 271/57 |
| 3,787,664 | 1/1974 | Johnson et al. | 235/92 |
| 4,015,110 | 3/1977 | Jones | 377/8 |
| 4,114,804 | 9/1978 | Jones et al. | 235/476 |
| 4,128,756 | 12/1978 | Nagano et al. | 377/8 |
| 4,255,651 | 3/1981 | Phillips | 377/8 |
| 4,256,299 | 3/1981 | Hogenson | 271/262 |
| 4,378,109 | 3/1983 | Takahashi et al. | 271/263 |
| 4,504,916 | 3/1985 | Oka | 364/471 |
| 4,514,856 | 4/1985 | Asai et al. | 377/8 |
| 4,521,102 | 6/1985 | Motomura et al. | 377/8 |
| 4,556,140 | 12/1985 | Okada | 194/4 |
| 4,576,287 | 3/1986 | Bingham et al. | 209/601 |
| 4,579,334 | 4/1986 | Durajczyk et al. | 271/263 |
| 4,608,704 | 8/1986 | Sherman, III et al. | 377/8 |
| 4,671,502 | 6/1987 | Sherman, III et al. | 377/8 |
| 4,700,368 | 10/1987 | Munn et al. | 377/8 |
| 4,707,598 | 11/1987 | Croset et al. | 250/223 |
| 4,707,843 | 11/1987 | McDonald et al. | 377/8 |
| 4,830,742 | 5/1989 | Takesako | 209/534 |
| 4,939,676 | 7/1990 | Worsley et al. | 377/8 |
| 4,967,383 | 10/1990 | Hirano et al. | 364/567 |
| 5,067,704 | 11/1991 | Tsuihiji et al. | 271/262 |
| 5,096,067 | 3/1992 | Tutamune et al. | 377/8 |

*Primary Examiner*—Margaret Rose Wambach
*Attorney, Agent, or Firm*—Shenier & O'Connor

[57] ABSTRACT

A currency counter for counting currency notes withdrawn from a supply and advancing the notes one by one along a path past a density detector and a magnetic material detector to a stacker at a delivery location upon energization of a common drive motor in which an amplifier responsive to the density detector is automatically calibrated each time the counter starts and in which density and motor current signals are combined for doubles detection. The motor speed is adjusted for document length to provide a predetermined number of counts per minute. An adaptive counterfeit check is made. The motor is deenergized at the end of a batch count and momentarily reenergized to ensure that the last note of the batch is stacked.

24 Claims, 30 Drawing Sheets

CONTROL SYSTEM FOR CURRENTY COUNTER

FIELD OF THE INVENTION

The invention is in the field of currency counters and relates to an improved control system for currency counters.

BACKGROUND OF THE INVENTION

There are known in the prior art devices for counting currency. Many of these counters employ photodetectors which serve the dual purpose of providing a count as notes pass by the detectors and of affording an indication of double feeds as by overlapping bills. Many of these detectors incorporate manually adjustable potentiometers for calibrating the LED-photodiode pairs making up the photodetectors.

One of the difficulties with counters of the type known in the prior art is the necessity for manually calibrating the LED-photodiode pairs.

While the doubles detection of counters of the prior art is generally satisfactory, it is not as certain as is desirable owing to dirt or dust in the optical system, for example. In doubles detection systems of the prior art an error signal is sounded and the machine is stopped each time a double is detected. Consequently such a doubles error requires that the operator restart the operation. By "double" we mean the delivery of two sheets at a time to the feed path or overlapping sheets.

Many of the counterfeit detectors of the prior art are provided with a magnetic means for detecting the presence of counterfeits. While these counterfeit detectors are in some degree satisfactory, they require readjustment for differences in component characteristics from unit to unit, magnetic ink or for different denominations or from batch to batch.

Machines of the prior art are capable of a slow speed batching operation which is employed by the operator in order to observe each note as it moves into the output tray. Such an operation might be used, for example, to detect the presence of a five dollar note among a stack of one dollar notes. In machines of the prior art the possibility exists that upon a slow speed hatching operation, the last bill of the batch which has been moved into the feed path and counted may never reach the output tray.

Some machines of the prior art may be set to count a predetermined number of notes per minute. When the length of the documents being counted changes, the count number per unit time is no longer accurate. By "length" we mean the dimension of the document in the direction of feed.

Certain machines of the prior art are in some degree programmable. However, the preset program is lost in the event of an interruption of power.

SUMMARY OF THE INVENTION

One object of our invention is to provide an improved control system for currency counters.

Another object of our invention is to provide an improved currency counter control system which does away with the LED photodiode pair adjusting potentiometers of counters of the prior art.

A further object of our invention is to provide an improved currency counter control system having a doubles detection arrangement which is more certain than are doubles detection arrangements of the prior art.

Still another object of our invention is to provide an improved currency counter control system with a doubles detection arrangement which is less inconvenient in use than are doubles detection arrangements of the prior art.

A further object of our invention is to provide an improved currency counter control system having a counterfeit detection arrangement which is more convenient than are counterfeit detection arrangements of the prior art.

A still further object of our invention is to provide a currency counter control system with a counterfeit detection arrangement which automatically adjusts for differences in component characteristics from unit to unit and also differences in magnetic ink on different denominations of notes.

Yet another object of our invention is to provide a currency counter control system with an improved motor speed control.

A further object of our invention is to provide a currency counter control system which automatically counts a predetermined number of notes per minute over a range of note sizes.

Yet another object of our invention is to provide a currency counter control system which ensures that the last note is delivered to the output tray in a slow speed hatching operation.

A still further object of our invention is to provide a currency counter control system which is programmable and in which the program and adjusted parameters for optimum operation are preserved in the event of an interruption of power.

Other and further objects of our invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

Figure 1:
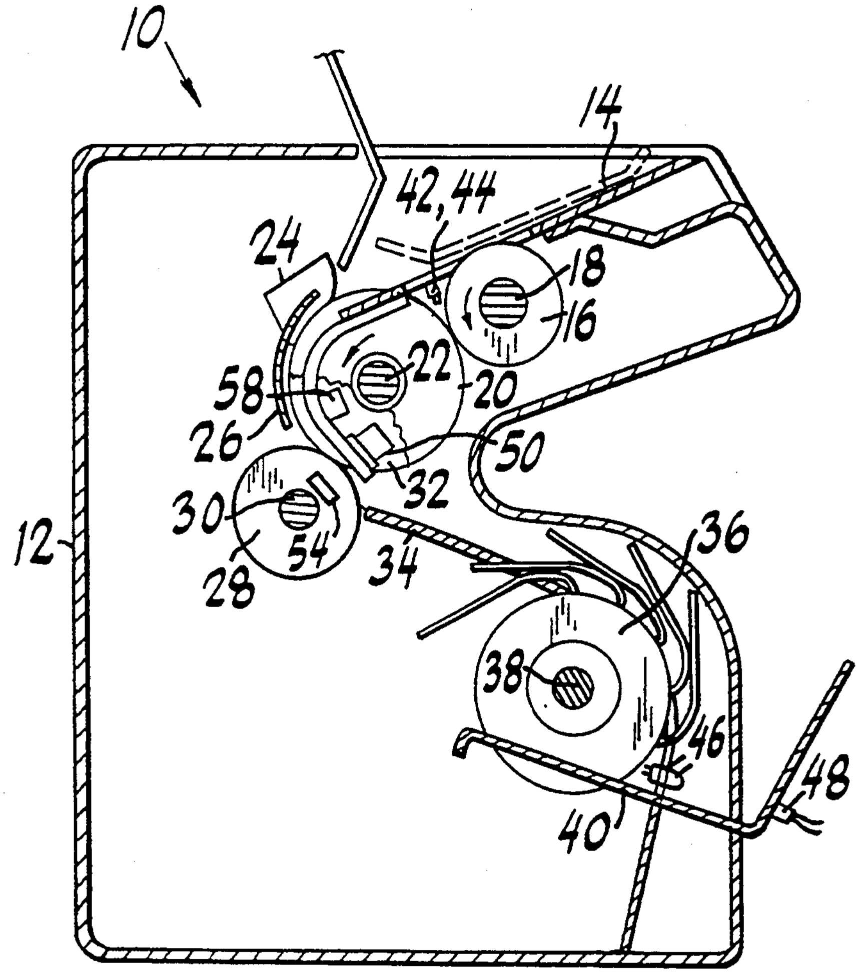
FIG. 1 is a partially schematic sectional view of a currency counter provided with our improved control system.

Referring now to FIG. 1 of the drawings, a currency counter indicated generally by the reference character 10 which may be provided with our improved control system includes a housing 12 supporting an input tray 14. A picker roll 16 carried by a shaft 18 is driven to remove bills one by one from a stack placed on the input tray 14 in a manner known to the art. Picker roll 16 advances the lowermost bills in the stack to feed rolls, one roll 20 of which is shown in FIG. 1, carried by a shaft 22. Respective strippers, one stripper 24 of which is shown in FIG. 1, are associated with the feed rolls to ensure that only a single bill at a time is advanced along the feed path.

A curved guide 26 directs bills along the feed path to the nip between a driven accelerator roll 28 carried by a shaft 30 and an idler accelerator roll 32 carried by the shaft 22 for rotation relative thereto.

Accelerator rolls 28 and 32 advance the sheets along a guide 34 to a stacker wheel 36 carried by a shaft 38. Shaft 38 is so driven that the stacker wheel 36 forms a stack of sheets on an output tray 40.

A common drive motor, to be described hereinbelow, drives all of the rotating elements of the counter 10.

As is known in the art, a light source 42 and associated detector 44 signal the presence of bills on the input tray 14. Similarly, a source 46 and detector 48 signal the presence of bills in the output tray 40.

Our system includes right and left side light sources 50 and 52 associated with respective detectors 54 and 56 for producing count and density output signals in a manner to be described hereinbelow. A magnetic head 58 produces an output signal which is a measure of the magnetic character of the ink with which the bill is printed.

Figure 3:
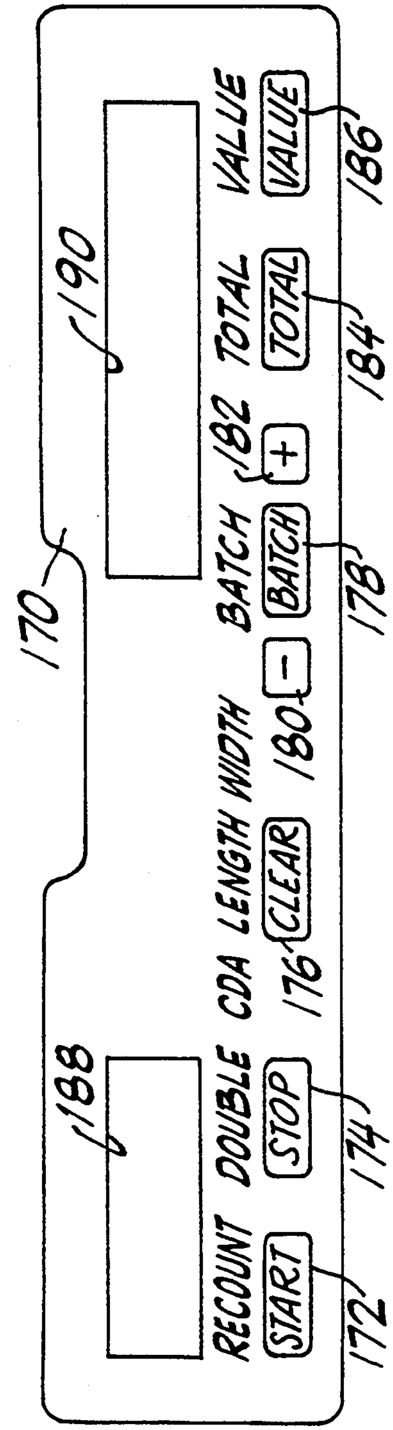
FIG. 3 is a plan of the switch pad and display window panel of the currency counter provided with our improved control system.

Referring now to FIG. 3, the counter 10 includes a panel 170 carrying switches 172, 174, 176, 178, 180, 182, 184 and 186 corresponding to "start", "stop", "clear", "batch", "−", "+", "total" and "value" switches. Panel 170 has two windows 188 and 190 for information display.

Figure 4:
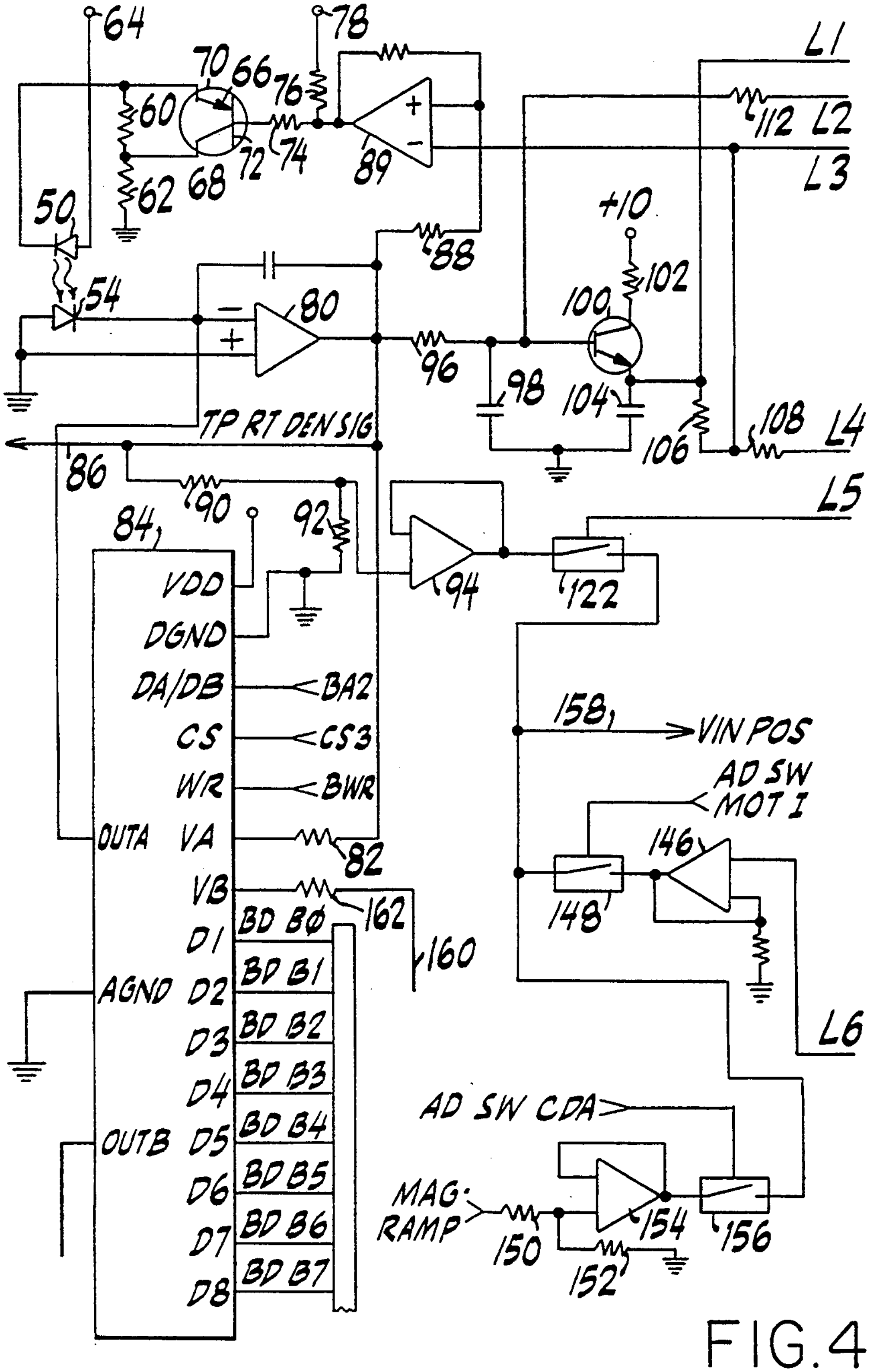
FIG. 4 is a partial schematic view of half of the analog portion of our improved control system for currency counter.
Figure 4:
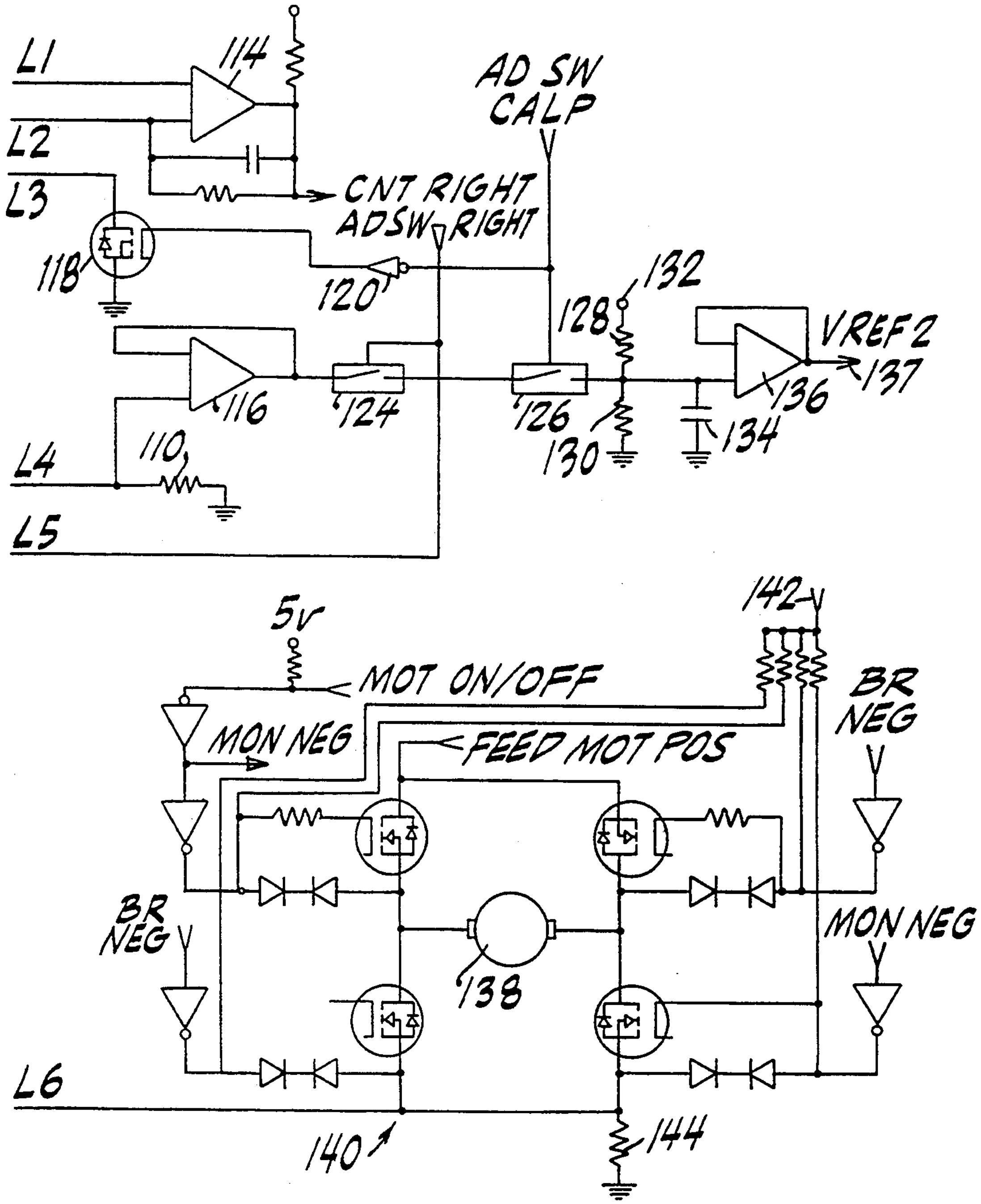

Referring now to FIG. 4, we connect the LED 50 in series with a pair of voltage dividing resistors 60 and 62 between the terminal 64 of a suitable source of potential and ground. The common terminals of LED 50 and resistor 60 and of the resistors 60 and 62 are connected respectively to the emitter 66 and collector 68 of a pnp transistor 70. We connect the base 72 of transistor 70 to a resistor 74 connected in series with a resistor 76 to the terminal 78 of a suitable source of potential. The arrangement just described functions to maintain the illumination provided by LED 50 as in the prior art.

We connect the detector 54 between ground and the negative terminal of a comparator 80, the positive terminal of which is connected to ground. A resistor 82 applies the output of trans-impedance amplifier 80 to the VA input of a digital-to-analog converter 84. It will be appreciated that the output of trans-impedance amplifier 80 and the conductor 86 connected thereto carry the density signal put out by trans-impedance amplifier 80. A resistor 88 couples this signal to one input of the comparator 89 which produces the drive current for the LED 50.

We connect the common terminal of a pair of voltage dividing resistors 90 and 92 connected between line 86 and ground to a voltage follower buffer 94, the output of which is the analog density signal for doubles and triples information on the right side of the paper path to be fed to the ADC and then processed in a manner to be described. By "triples" we mean the passage of three sheets at a time along the feed path.

An RC filter made up of a resistor 96 and a capacitor 98 couples the output of trans-impedance amplifier 80 to a charge pump formed by a transistor 100, a resistor 102 and a capacitor 104 connected in series between a suitable source of potential and ground. A voltage divider made up of resistors 106, 108 and 110 connected between the emitter of transistor 100 and ground provides voltages which are fed to various active sections of the system for comparison and scaling of ADC positive input. A resistor 112 connects the common terminal of resistor 96 and capacitor 98 to one input terminal of a count comparator 114. We apply the signal at the emitter of transistor 100 to the other input terminal of comparator 114. In response to these inputs, comparator 114 produces a CNT RIGHT signal.

We apply the voltage at the common terminal of resistors 106 and 108 to the comparator 89 and to the source of a transistor 118. An inverter 120 is adapted to apply a calibration positive signal CALP derived from the central computer in a manner to be described to the gate of transistor 118.

We apply the voltage at the common terminal of resistors 108 and 110 to a voltage follower buffer 116, the output of which is adapted to be connected by a first switch 124 to a second switch 126 to a buffer 136 and to the ADC VREF/2 input for scaling of VIN POS.

An analog to digital switch right signal AD SW RIGHT is applied to switch 122 to send the right sensor signal to the analog to digital converter. This signal also closes switch 124 to connect buffer 116 to switch 126.

Switch 126 in turn is closed whenever the CALP signal is not true to connect the buffer to the common terminal of voltage dividing resistors 128 and 130 connected between a source 132 and ground. A capacitor 134 applies the signal to an output amplifier 136, which feeds the ADC scaling input VREF/2.

The apparatus with which our control system is used includes a drive motor 138, the operation of which is controlled by a circuit indicated generally by the reference character 140. The motor is powered from a suitable source "FEED MOTOR POS" such as 30 volts unregulated current. In the machine 10 illustrated in the drawings, this motor 138 is the prime mover for all of the rotating parts of the machine. A resistor 144 is connected between the circuit 140 and ground to provide a measure of motor current. The voltage across resistor 144 is coupled by an amplifier 146 through an analog switch 148 to the A-D converter's VIN POS which receives a signal AD SW MOT I from the central processing unit when the motor current is to be sampled.

A voltage divider made up of resistors 150 and 152 connected between the output MAG RAMP of the magnetic head 58 and ground provides an input signal to a buffer 154 which provides the input to an analog to digital switch 156. This switch receives a signal AD SW CDA from the central processing unit when the output of the head 58 is being checked to determine the existence of a counterfeit.

The output terminals of all of the switches 122, 148 and 156 are connected to a common line 158. It is to be understood that the output of the magnetic head 58 is not directly connected to the voltage divider but goes through amplification rectification and integration in a manner known to the art. The output of the integration stage is applied to the voltage divider.

It will be remembered that the device to which our control system is applied has a left sensor pair as well as a right sensor pair. For purposes of simplicity, we have not shown the circuitry associated with the left sensor pair since it is identical with that associated with the right sensor pair. By way of example we have shown a line 160 leading from the circuitry associated with the left sensor pair and carrying the left signal corresponding to the right signal put out by trans-impedance amplifier 80. A resistor 162 applies this signal to the VB input to digital to analog converter 84.

Figure 5:
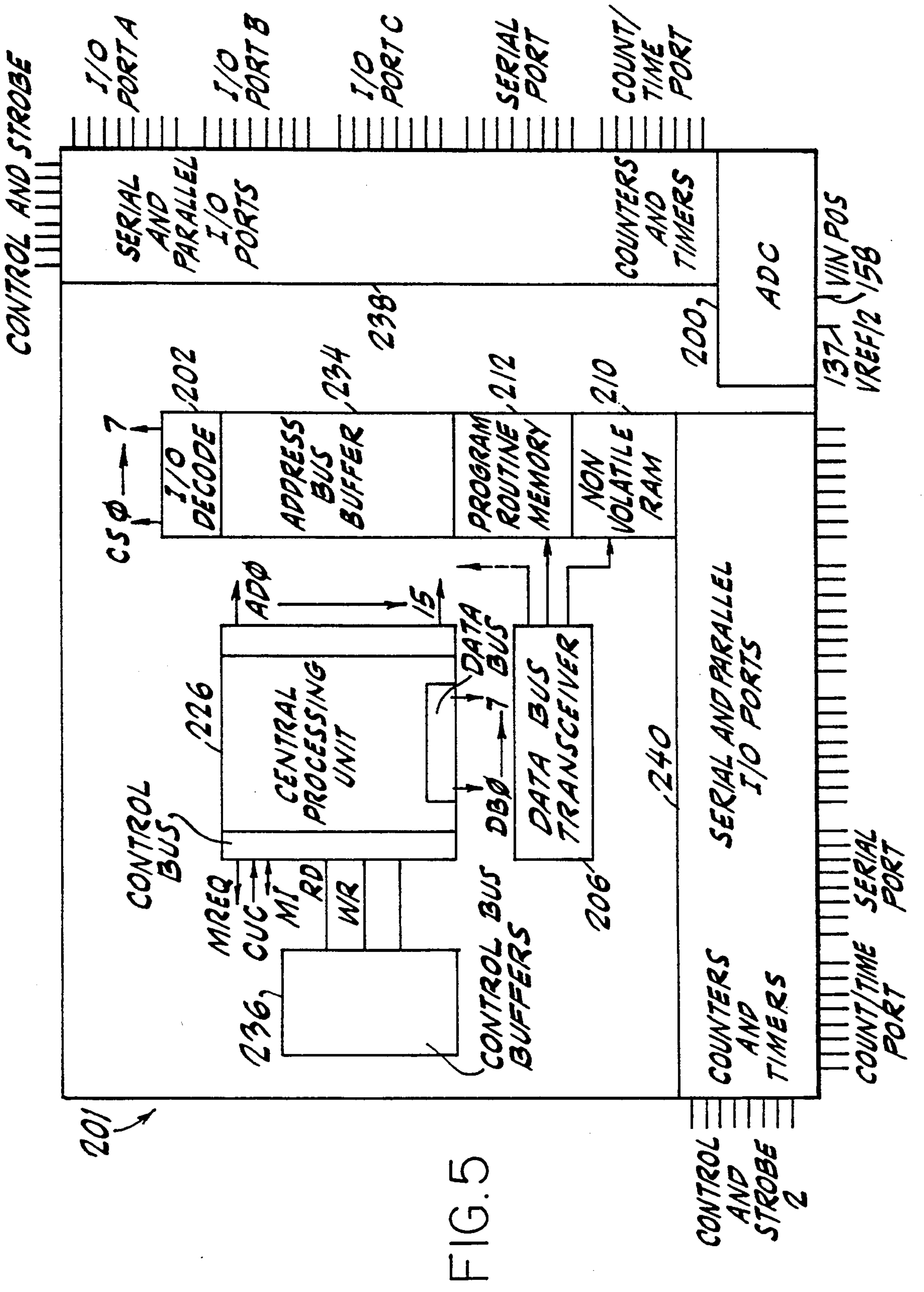
FIG. 5 is a schematic view of the digital portion of our improved control system for currency counters.

Referring now to FIG. 5, the VIN POS signal appearing on conductor 158 is applied to the corresponding terminal of an analog to digital converter 200 such as an ADC 0801. For ratiometric operation the voltage reference divided by two signal VREF/2 on conductor 137 also is applied to the converter 200.

The digital processing section, indicated generally by the reference character 201, of our control system includes the ADC 200, an I/O decoder 202, a program routine memory 212, a non-volatile memory 210, and a central processing unit 226. A data bus transceiver 206 provides communication between the CPU 226 and the memories 210 and 212. Address bus buffers 234 and control bus buffers 236 are provided. A pair of large input-output chips 288 and 240 complete the digital processing section.

Figure 6:
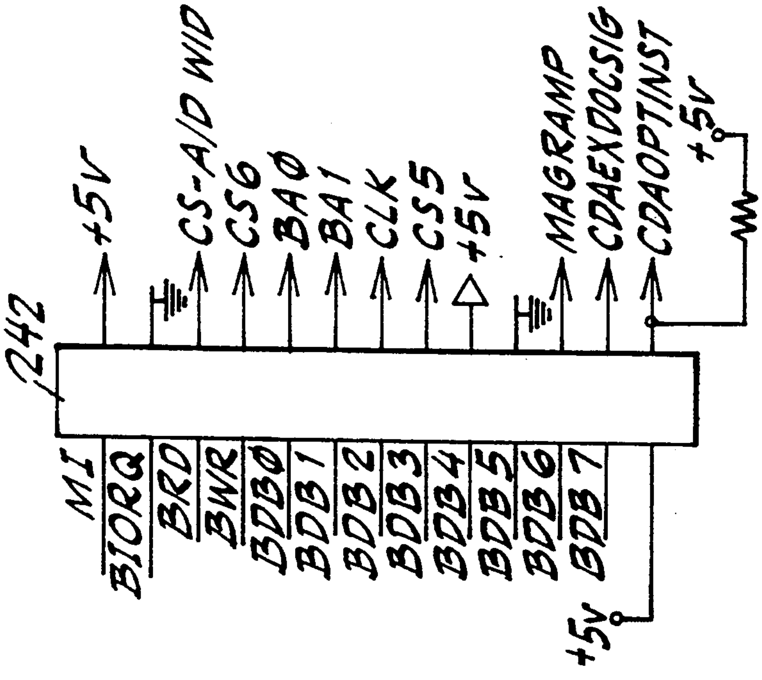
FIG. 6 is a schematic view of the width and counterfeit detection interface and special function programming switch assembly of our control system.

Referring now to FIG. 6, a CDAOPTINST signal, when low, indicates through connector 242 that the counterfeit detection option is installed. Other signals are provided as indicated.

Figure 7:
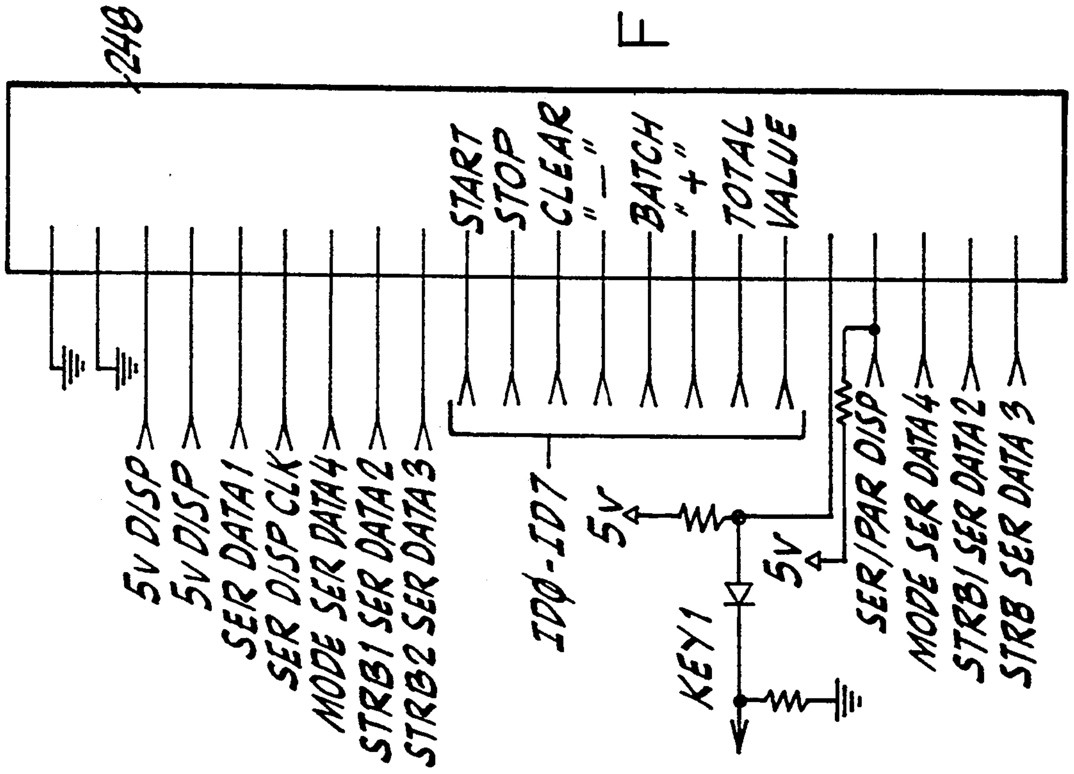
FIG. 7 is a schematic view of the serial and parallel display interface of our control system.

As shown in FIG. 7, the SER PAR DISP signal indicates to the processor whether a serial or parallel display board is installed.

Figure 8:
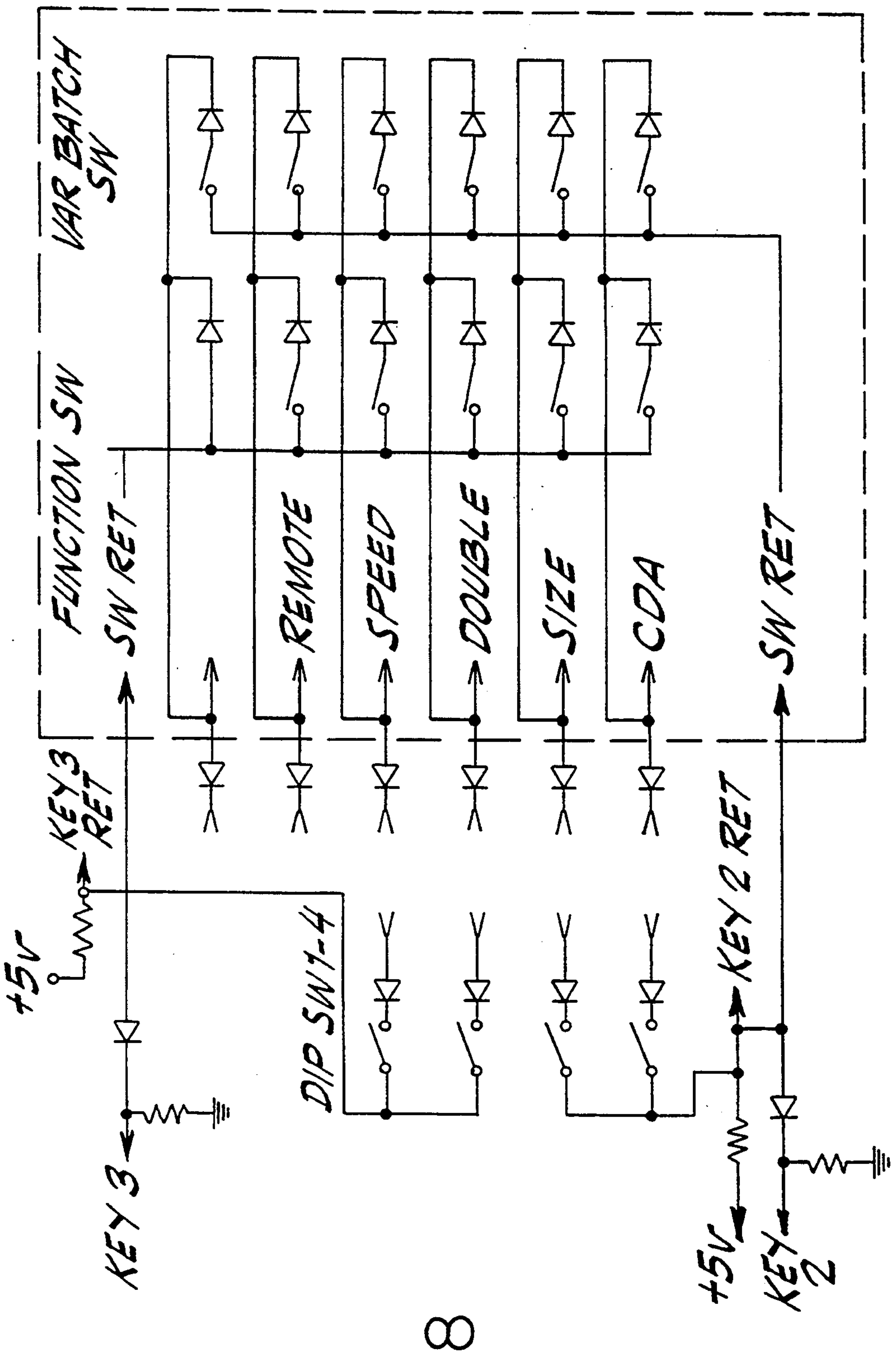
FIG. 8 is a schematic view of one of the various auxiliary switches of our control system.

Referring to FIG. 8, switches are shown for setting the various functions as well as 0–9 digit switches for variable batch settings.

Figure 9:
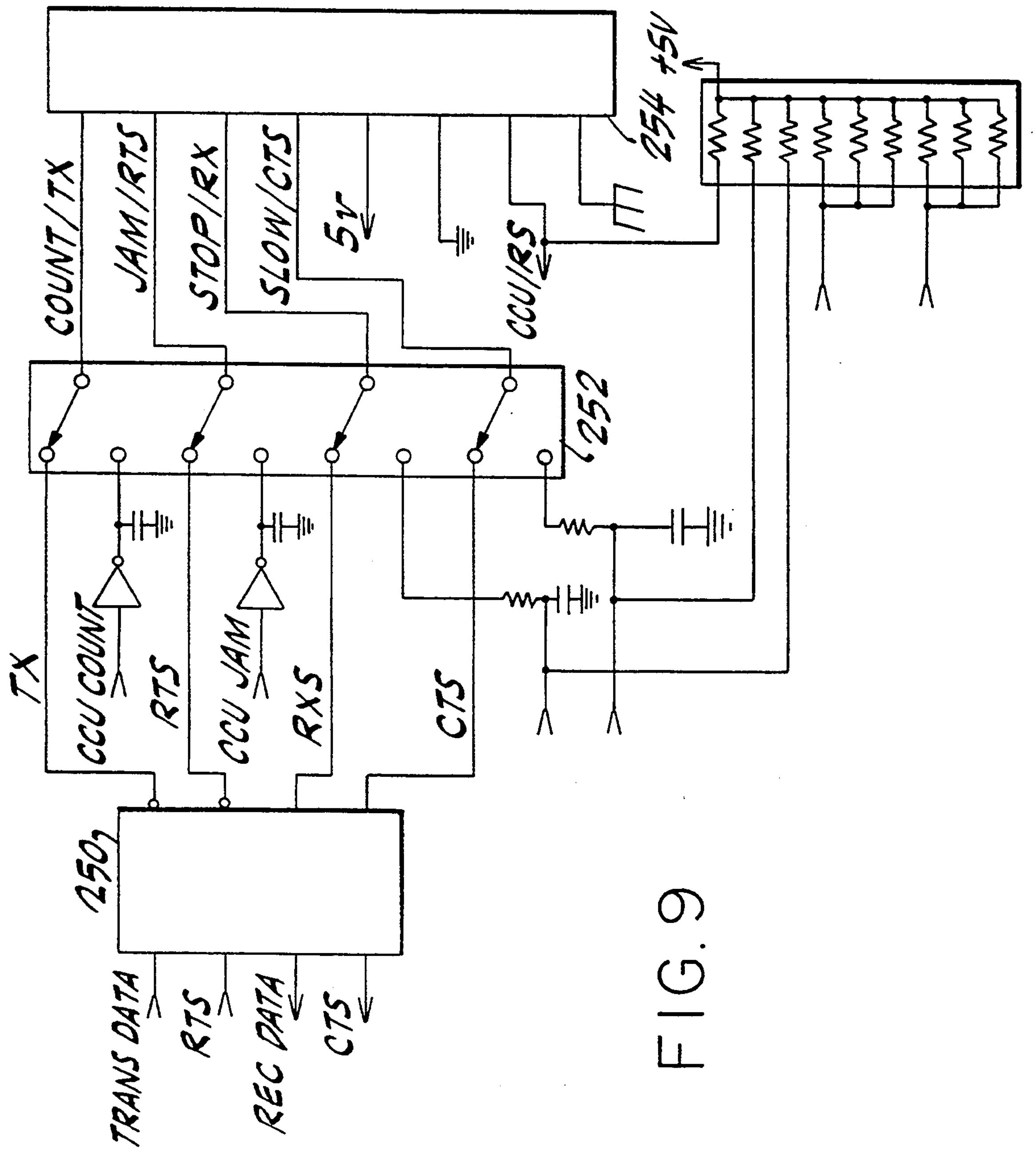
FIG. 9 is a schematic view of another part of the communication of our control system.

Referring now to FIG. 9, our system may be set up to operate as a self-contained unit or to communicate with a remote device. A mode selection device 252 can be set to communicate with various remote devices.

Figure 10:
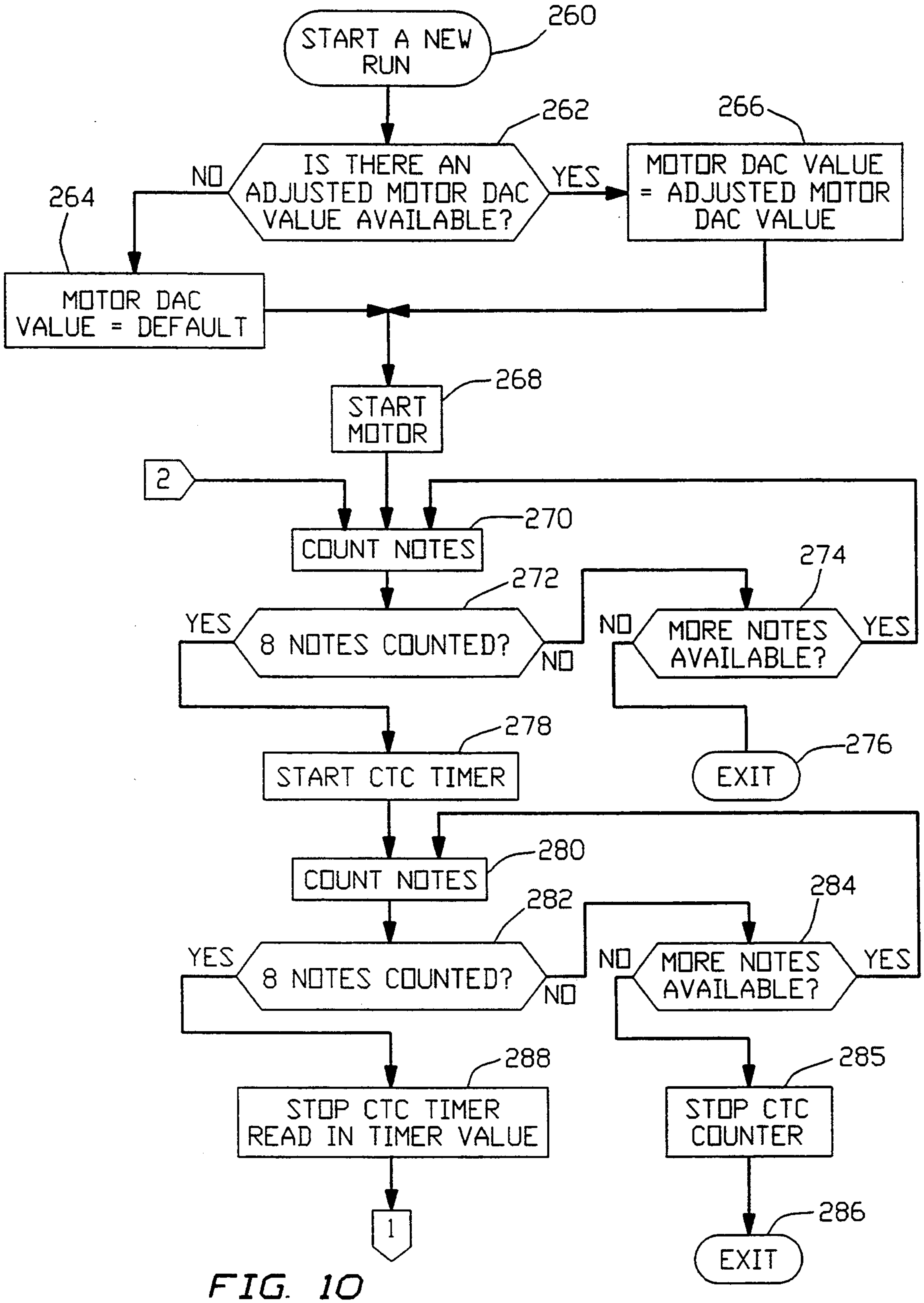
FIG. 10 is a flow chart illustrating the first portion of the operation of our control circuit in adjusting motor speed to hold the counter speed at a certain number of notes per minute.
Figure 11:
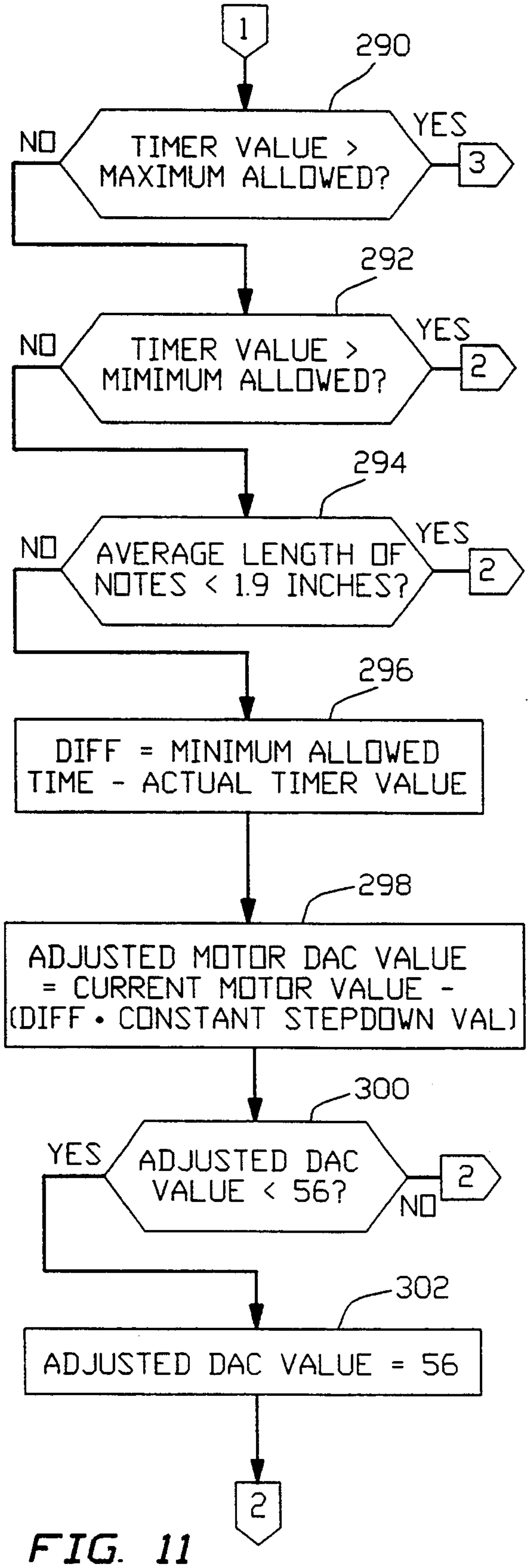
FIG. 11 is a flow chart illustrating a further portion of the operation of our control circuit in adjusting motor speed.

Referring now to FIG. 10, there is shown the initial part of the program for adjusting motor speed to retain the currency counter speed at a particular number of notes per minute. For example, 1500 notes per minute could be high speed. In operation, a new run is started at 260 and a check is made at 262 to see whether or not there is an adjusted motor digital-to-analog converter (DAC) value available. If not, the motor DAC value equals a default, as indicated at 264. If so, the motor DAC value equals the adjusted motor DAC value. In either case, the system proceeds to start the motor at 268 and counting of the notes begins at 270. A check is then made at 272 of whether or not a specific number of notes, such as eight notes, have been counted. If not, a check is made at 274 to see whether or not more notes are available. If not, the system exits at 276. If so, it returns to 270 to continue the note count.

Figure 12:
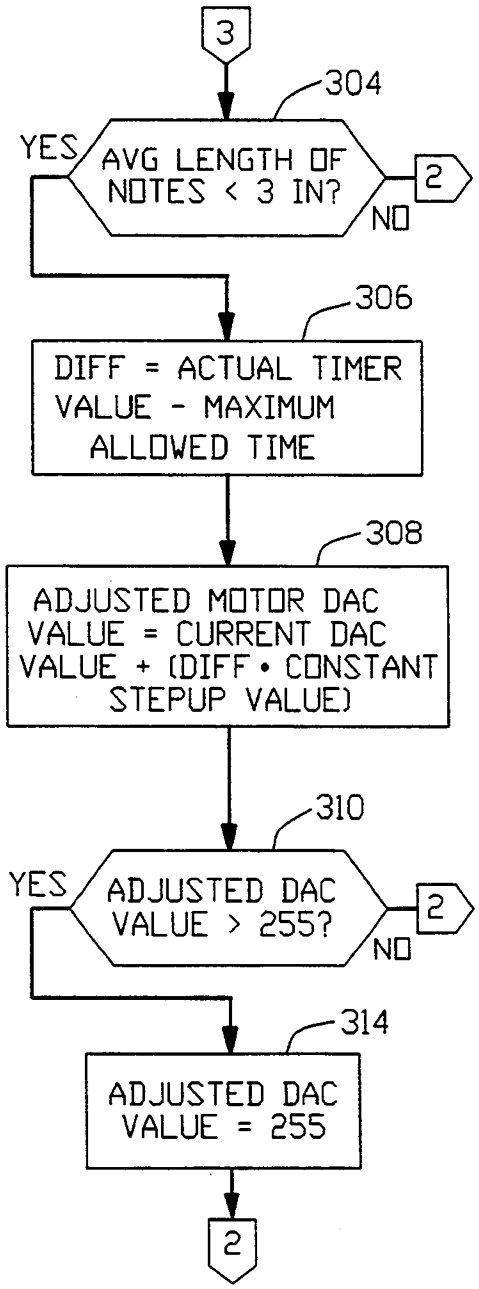
FIG. 12 is a flow chart illustrating the final portion of the operation of our control circuit in adjusting motor speed.

After eight notes have been counted, the CTC timer is started at 278 and the note count proceeds at 280. Again, a check is made at 282 to see whether or not eight notes have been counted. If not, a check is again made at 284 to see whether or not more notes are available. If not, the system stops the CTC counter at 285 and exits at 286. If so, the system returns to 280 to continue the count. When eight notes have been counted with the CTC timer running, the timer is stopped, its value is read and the system proceeds to "1" in FIG. 13. At this point a check is made at 290 to determine whether or not the timer value is greater than the maximum allowed time. If not, the system proceeds to 292 at which a check is made to see if the timer value is greater than the minimum allowed. If so, the system returns to "2" of FIG. 12 to count notes at 270. If the timer value is not less than the minimum allowed, the system proceeds to 294 at which a check is made to determine if the average length of notes is less than a specified length of, for example, 1.9 inches. If so, the system again returns to "2" of FIG. 12. If not, the program proceeds to 296 at which the difference between the minimum allowed time and the actual timer value is determined. Next, at 298, the adjusted motor DAC value is set to equal the current motor value minus the difference determined at 296 times a constant step-down value. Following this operation, a check is made at 300 of whether or not the adjusted DAC value is less than 56, for example. If not, the system returns to "2" of FIG. 12. If the adjusted DAC value is less than 56, the adjusted DAC value is set to equal 56 at 302 and the program again returns to "2" of FIG. 12.

Figure 14:
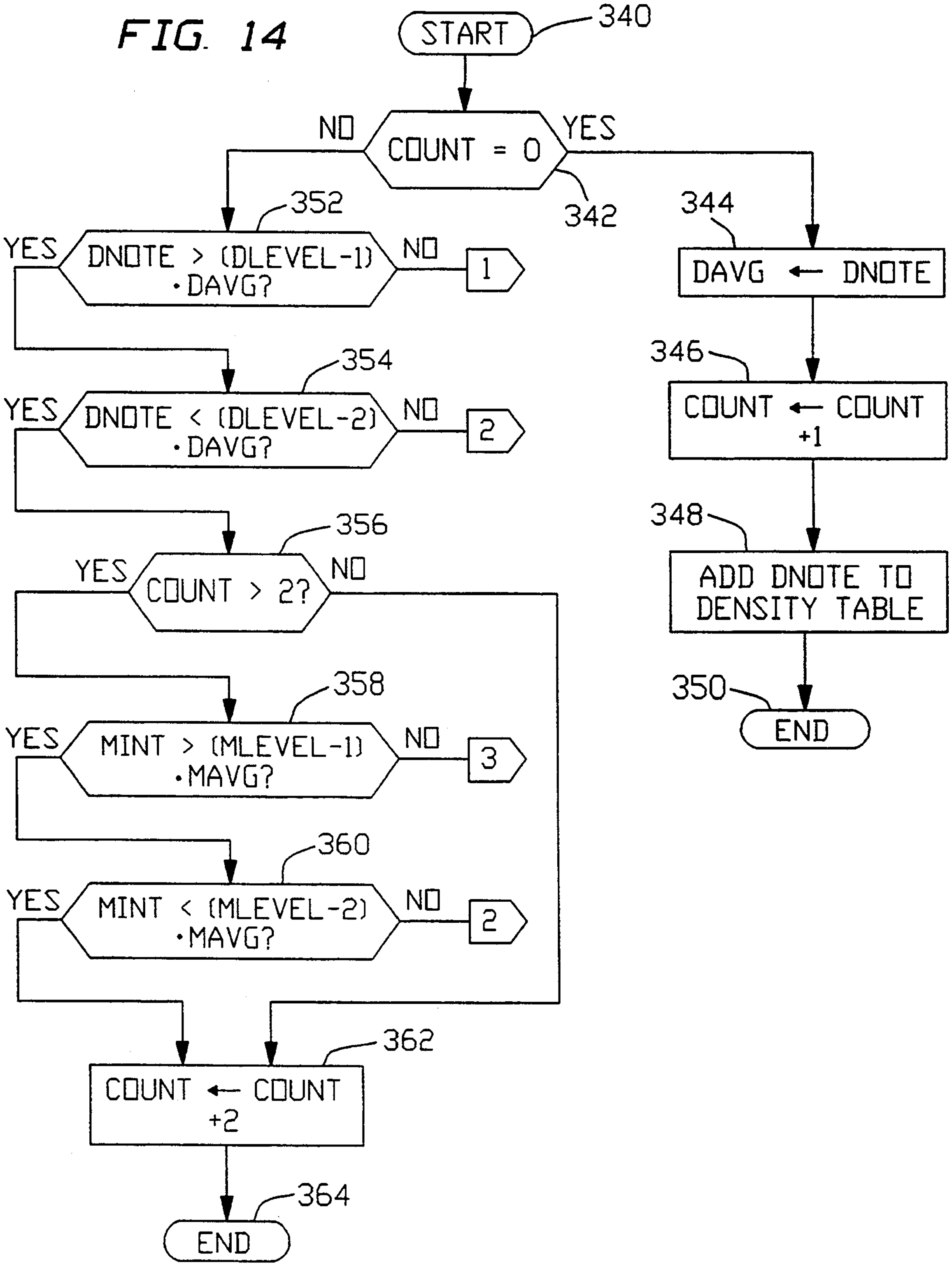
FIG. 14 is a flow chart illustrating the initial part of the multiple note detection operation in our control system.

If the check made at 290 shows that the timer value is greater than the maximum allowed value, the system proceeds to "3" of FIG. 14. A check is made at 304 of whether or not the average length of notes is less than a predetermined length of, for example, three inches. If not, the system returns to "2" of FIG. 12. If so, the difference between the actual timer value and the maximum allowed time is determined at 306 and the adjusted motor DAC value is set equal to the current DAC value plus the product of the difference from 306 and a constant step-up value at 308. Next, at 310 a determination is made of whether the adjusted DAC value is greater than 255, for example. If not, the program returns to "2" of FIG. 12. If so, the adjusted DAC value is set to 255 at 314 and the program returns to "2" of FIG. 12.

As will be explained more fully hereinbelow, on each power up the software automatically examines various signals to determine whether there is a variable batch keyboard or a standard keyboard for the five standard functions, whether the display unit has a serial interface by one manufacturer or a parallel interface by another manufacturer and what options are installed so that it can change its routine to communicate. A certain section of memory 210 contains a bit pattern representing this information and also a standard test pattern. The software stores the program revision number which should match the number hard coded into the ROM 212. If the contents of either of these locations is not valid, then the software performs a memory reset and returns all the above-mentioned values to their defaults. By saving the program revision number, we ensure that a memory reset is performed every time the software revision or program version is changed.

In addition to the foregoing, if the user holds down the "CLEAR" key and then powers up the unit it returns to all default values irrespective of whether the memory is intact or the program revision is changed. This is a soft reset which can be performed by the user.

In our control system the data in non-volatile memory 210 is retained even when power to the unit has been switched off. This is accomplished by using a non-volatile memory such as an EEPROM or a battery back-up. This results in the saving of program to batch values, selected batch value, if any, at the time of power off, error detections settings and speed setting, along with any adjusted parameters for optimum operation.

Figure 13A:
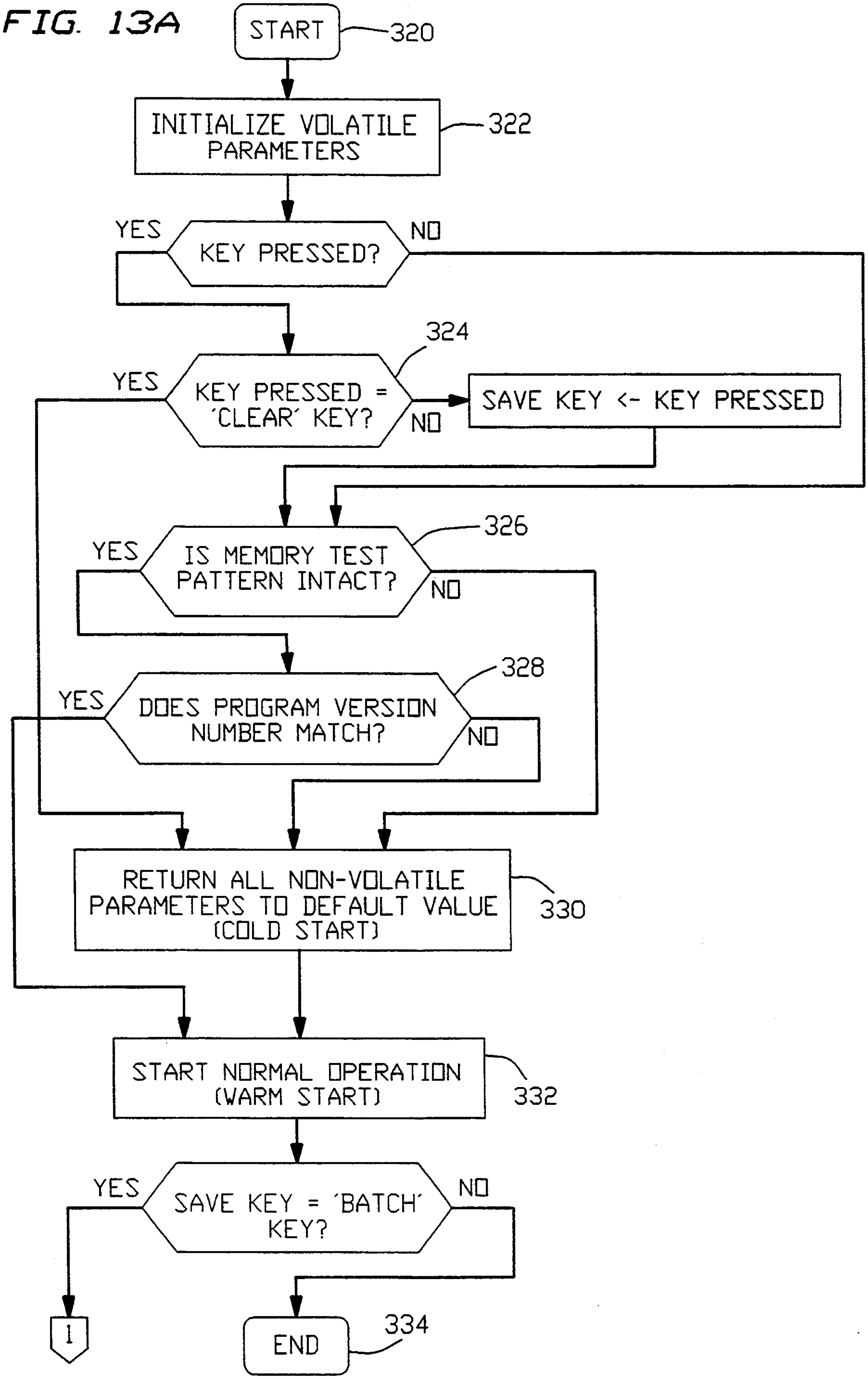
FIGS. 13A to 13O are flow charts illustrating the programmability of our system and the operation of the non-volatile memory of our control system.

Referring to FIG. 13A, there is shown the management of the non-volatile arrangement. In the Figure "volatile parameters" are all currency counter parameters that are not retained when power is turned off and back on again. "Non-volatile" parameters are those which are retained when power is turned off and back on again.

At the start 320, the volatile parameters are initialized at 322. A determination is made at 324 of whether or not the "CLEAR" key has been pressed. If not, a check is made to see if the memory test pattern is intact at 326. If so, a check is made at 328 of whether or not the program version numbers match. If the answer at 324 is yes, or the answer at 326 or 328 is no, the system proceeds at 330 to return all non-volatile parameters to default value. If the answer at 328 is yes, or after the operation of block 330, normal operation proceeds at 332 and the routine ends at 334.

Figure 13B:
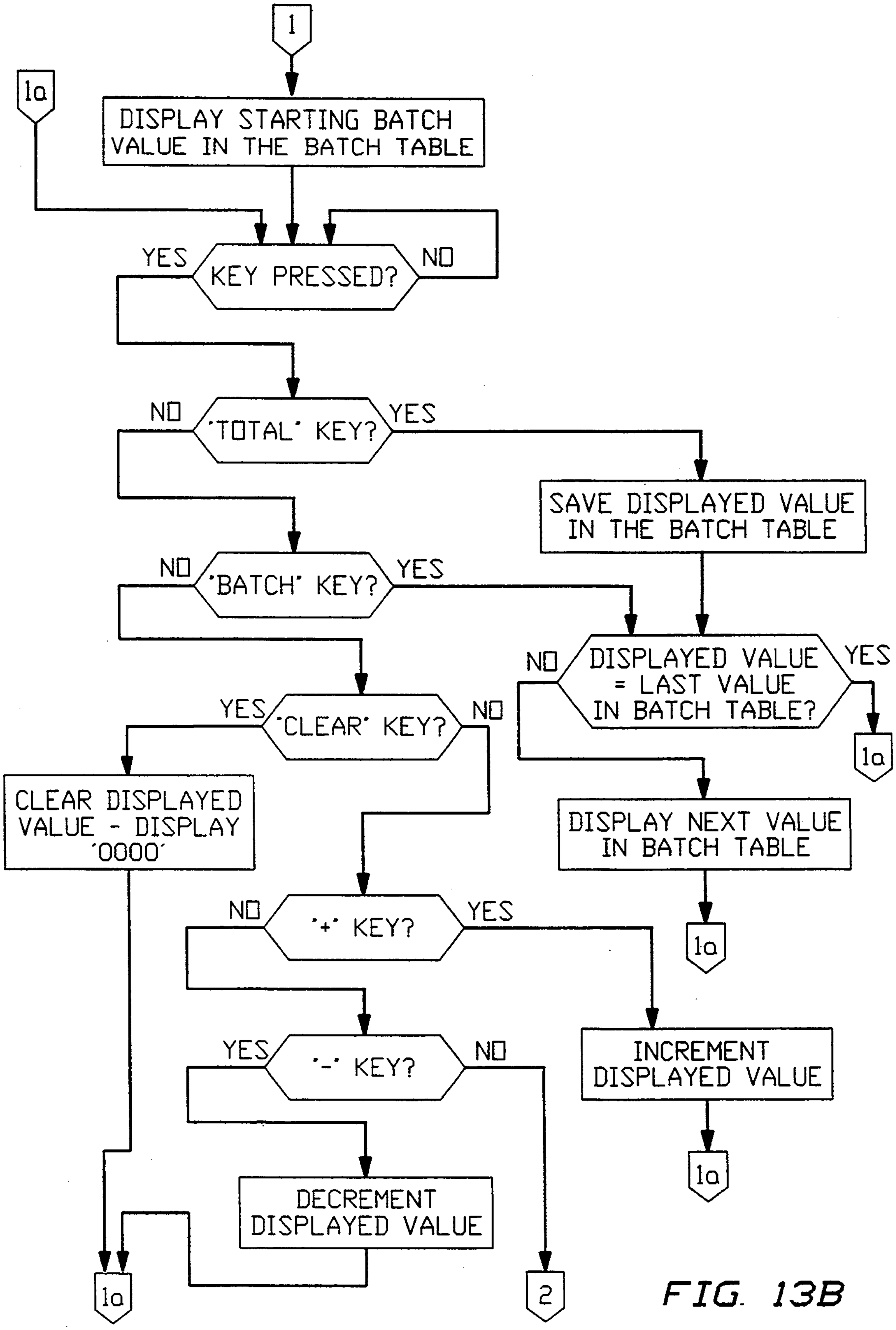
Figure 13C:
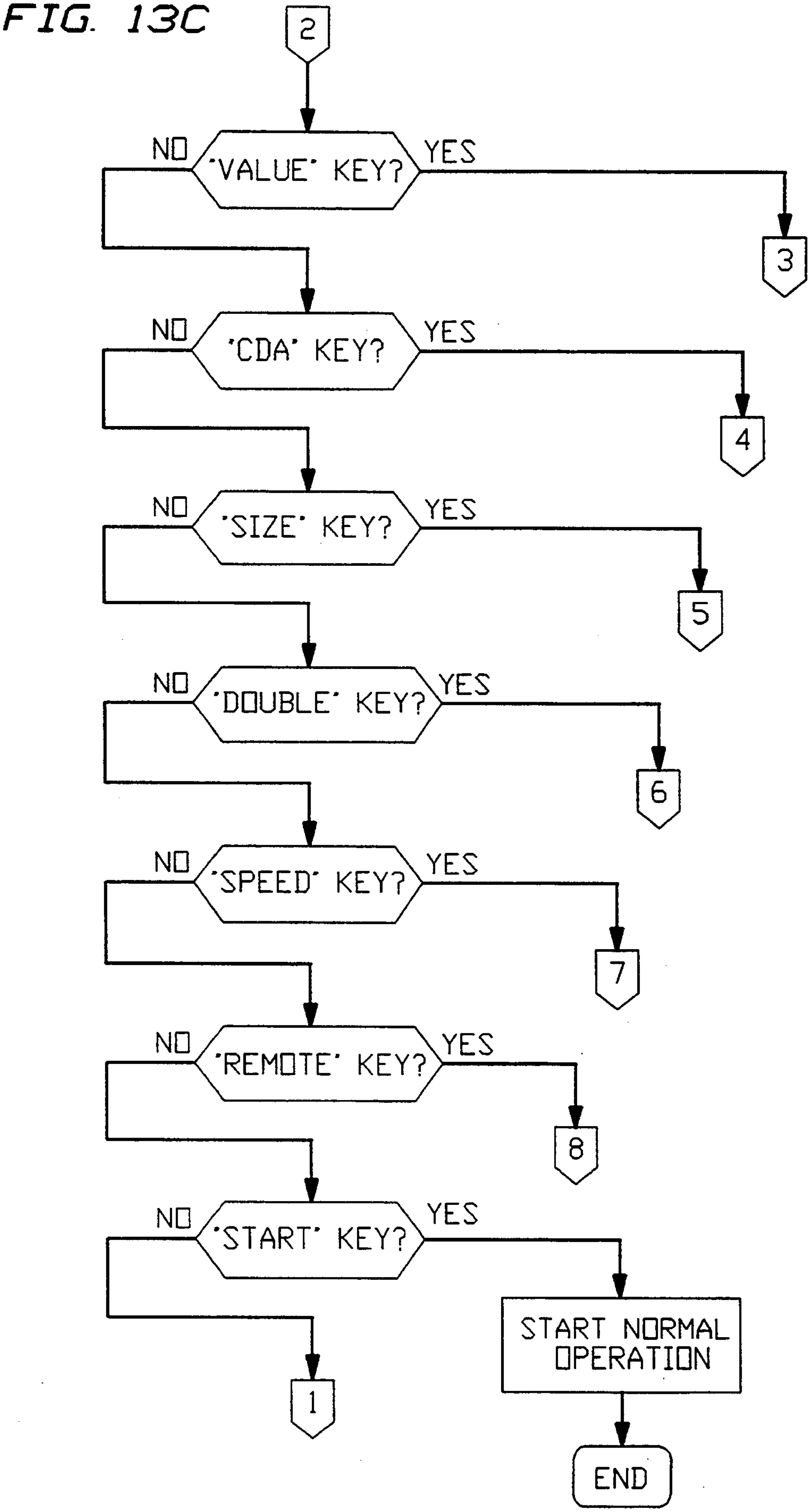
Figure 13D:
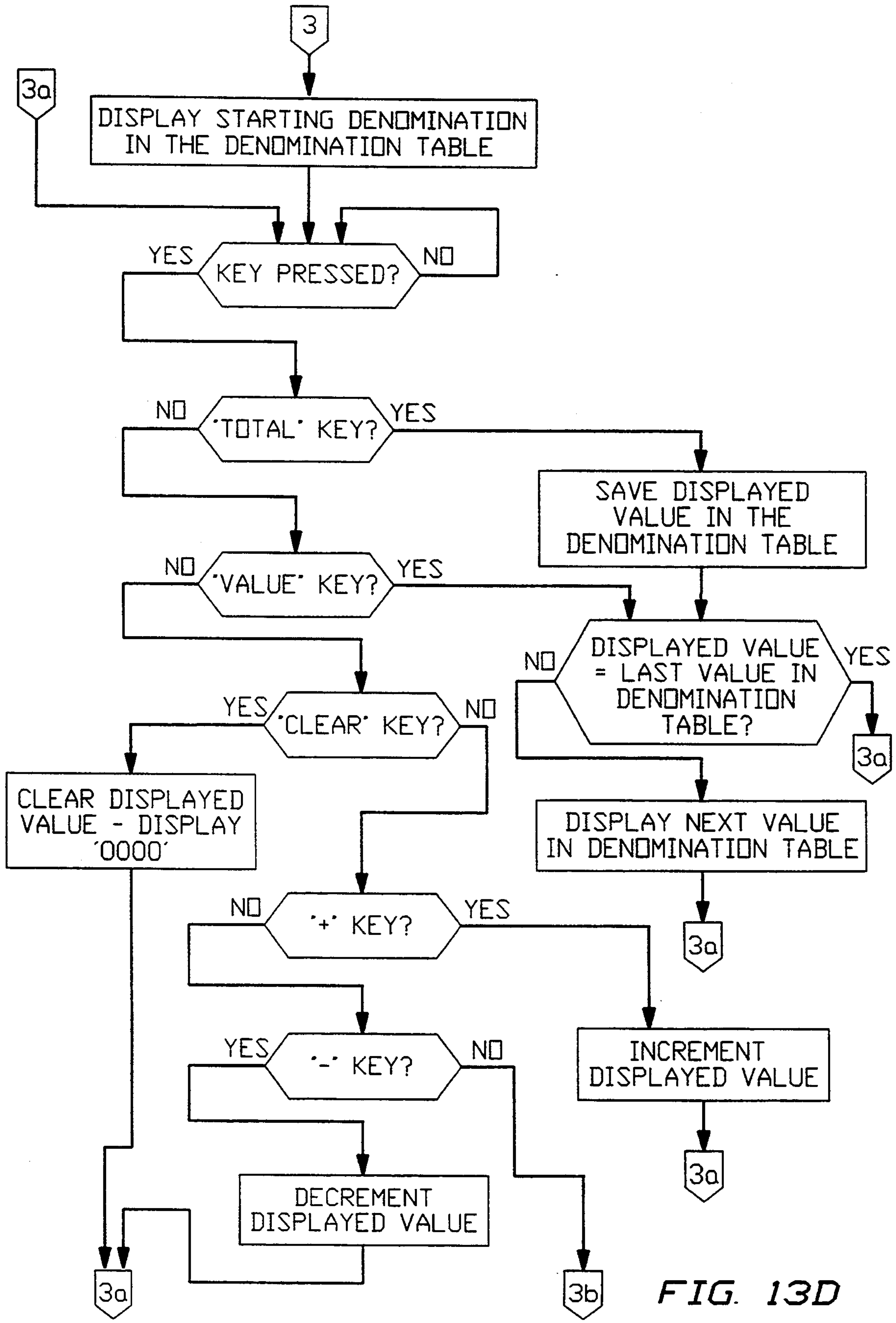
Figure 13E:
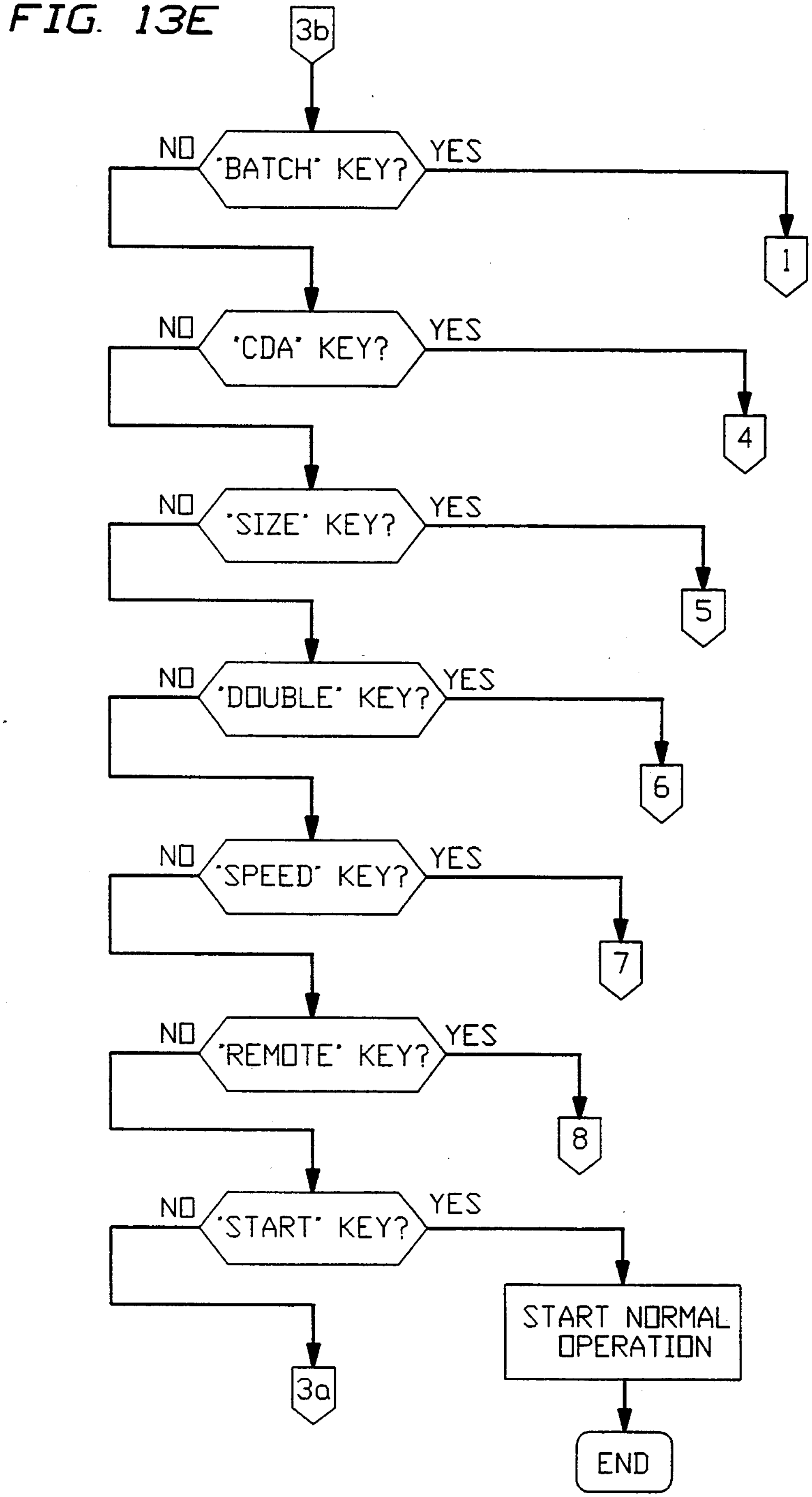
Figure 13F:
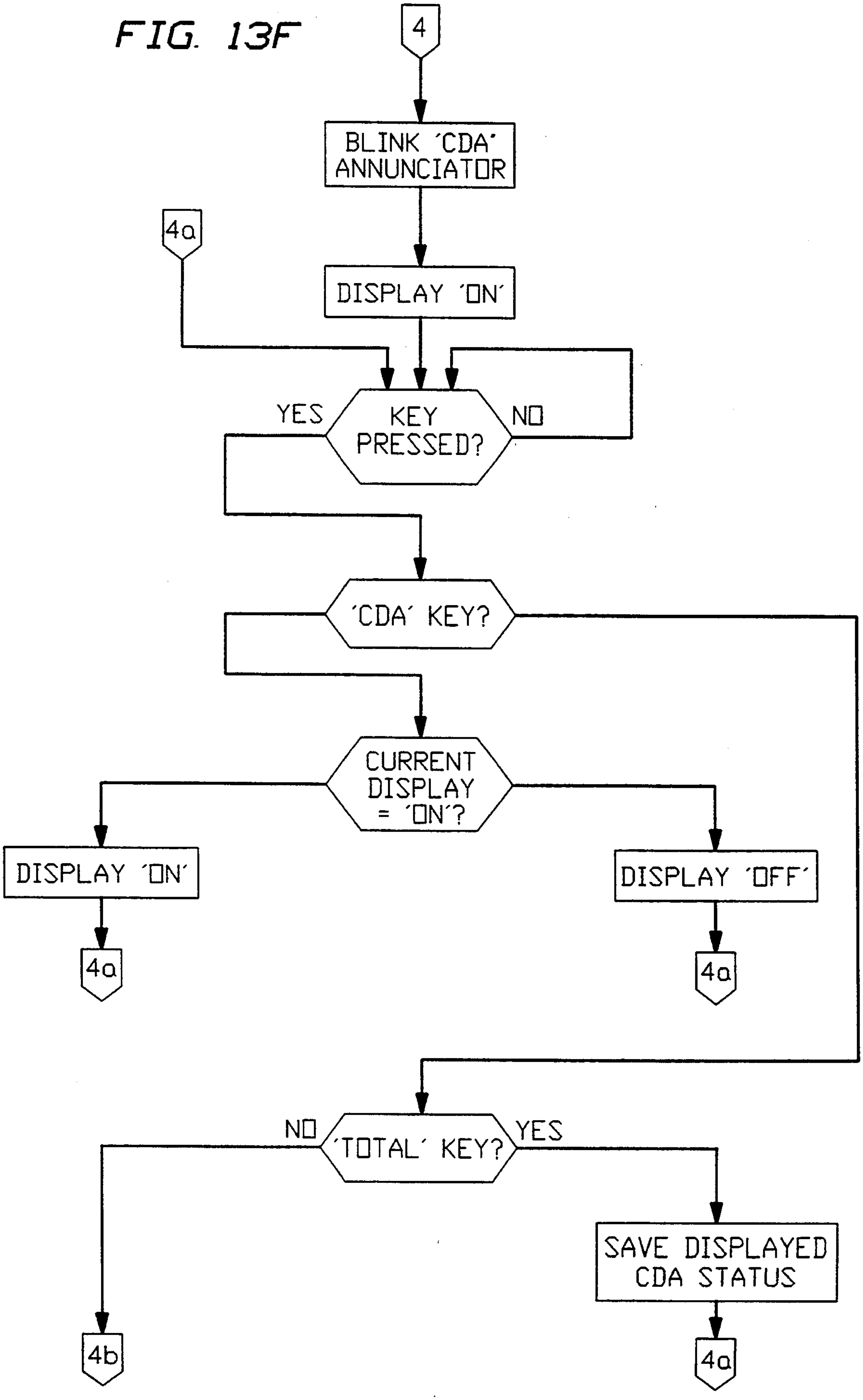
Figure 13G:
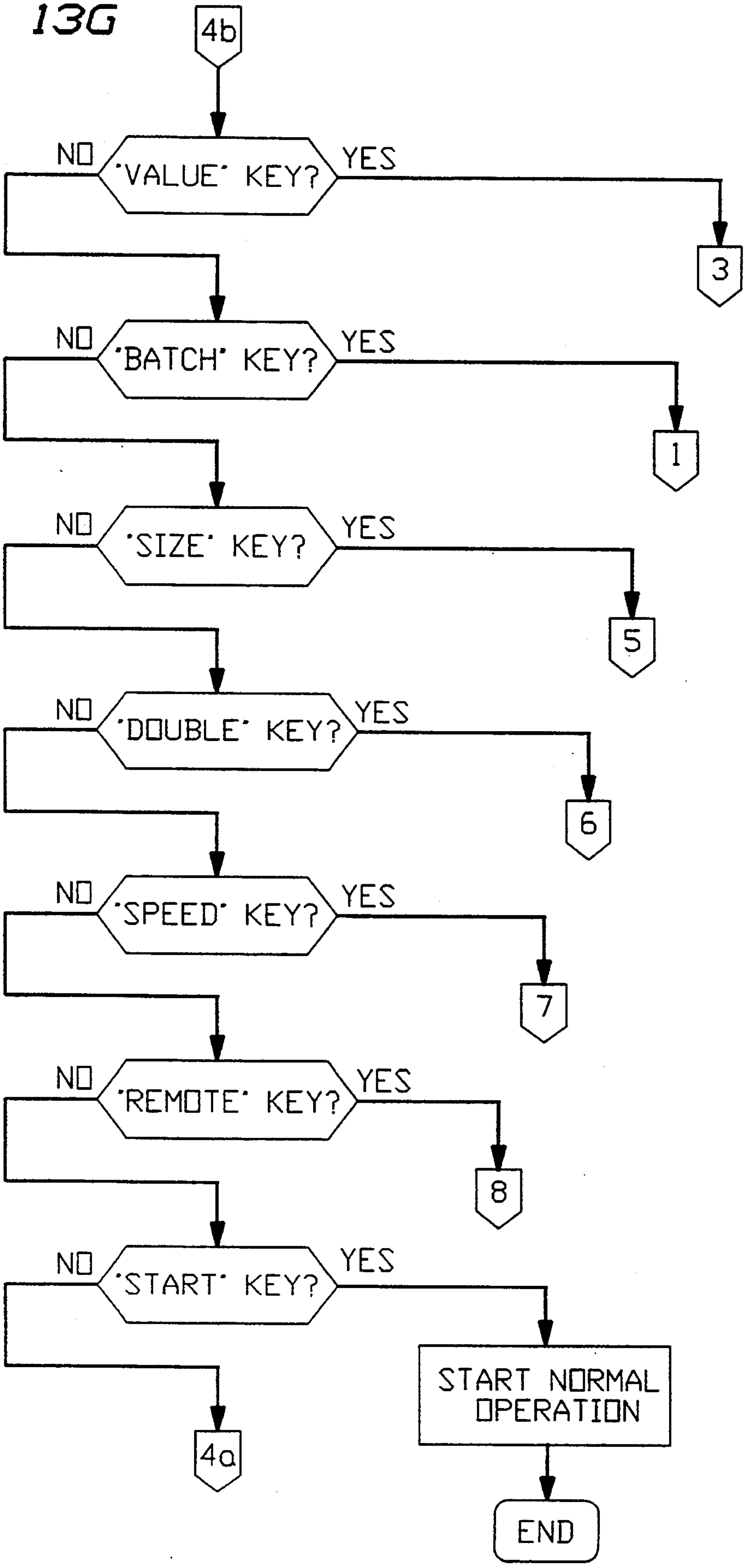
Figure 13H:
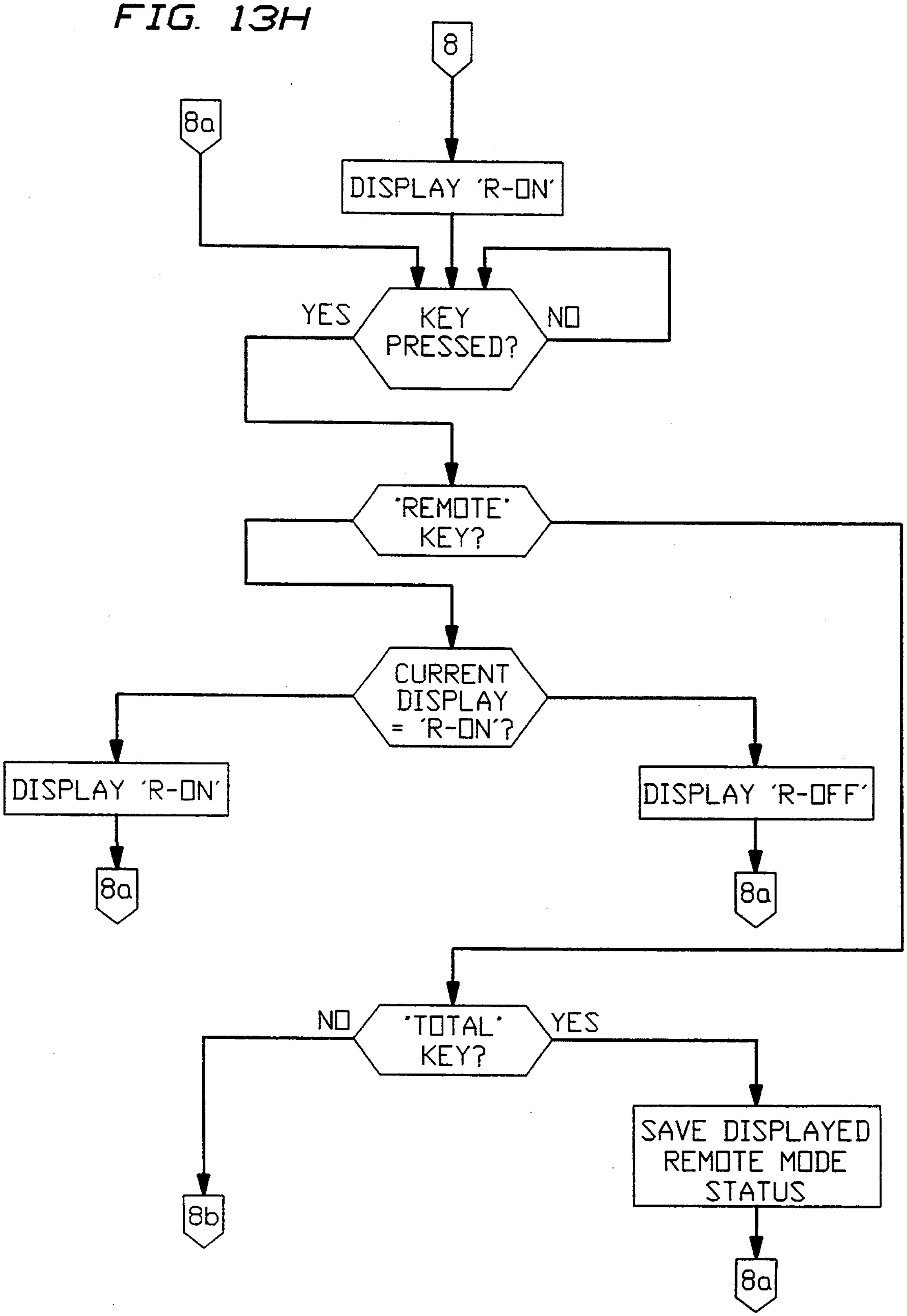
Figure 13I:
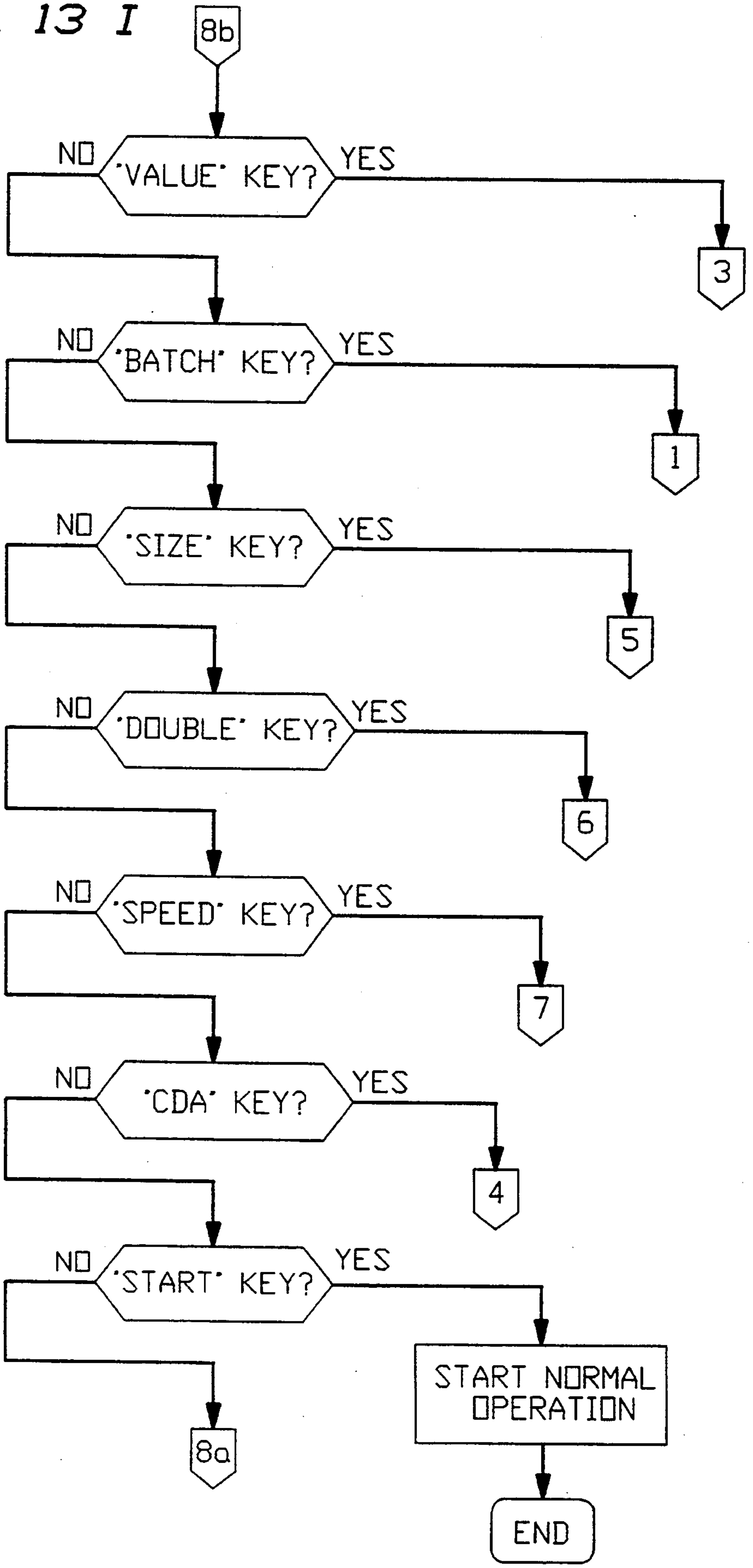
Figure 13J:
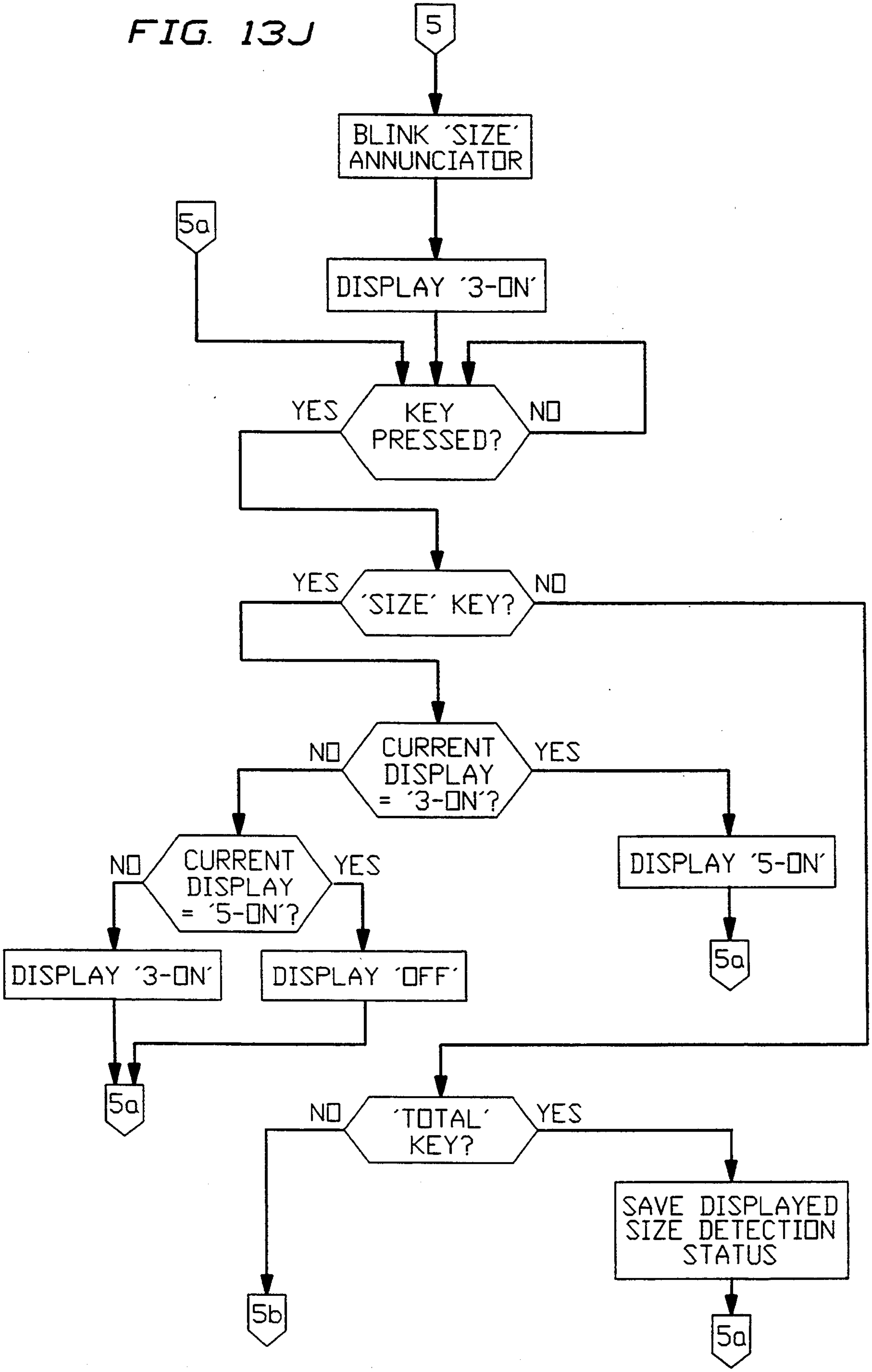
Figure 13K:
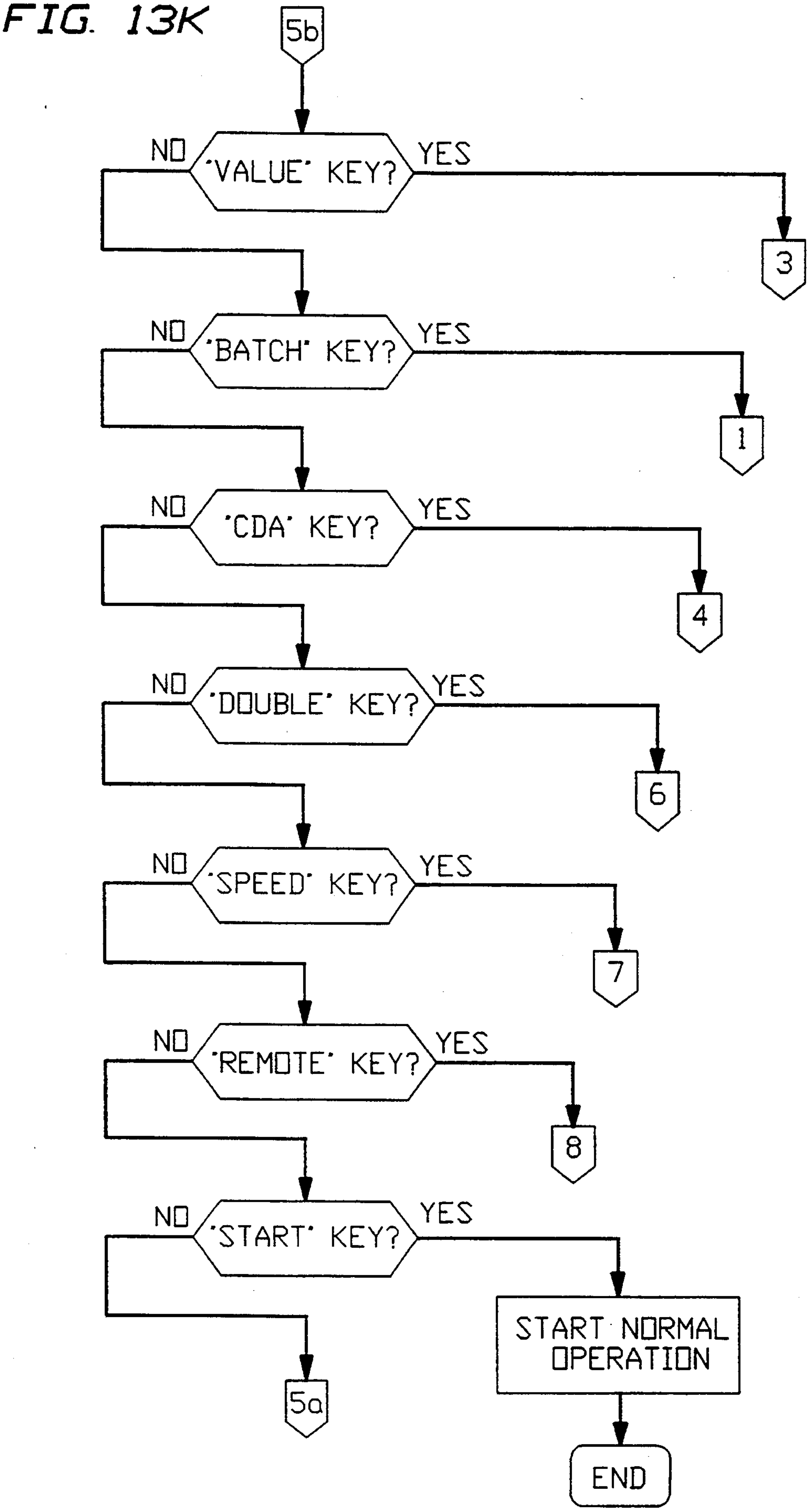
Figure 13L:
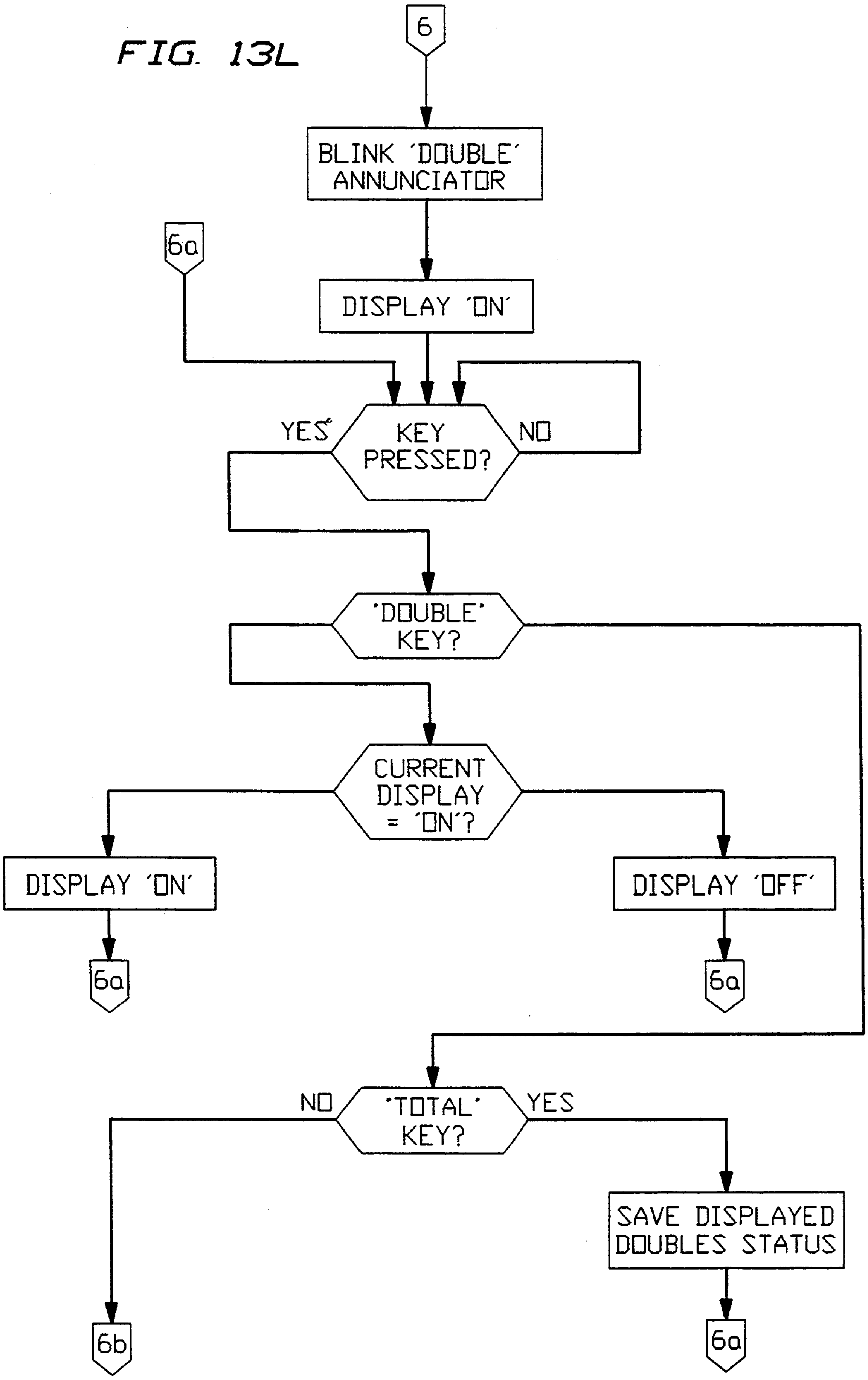
Figure 13M:
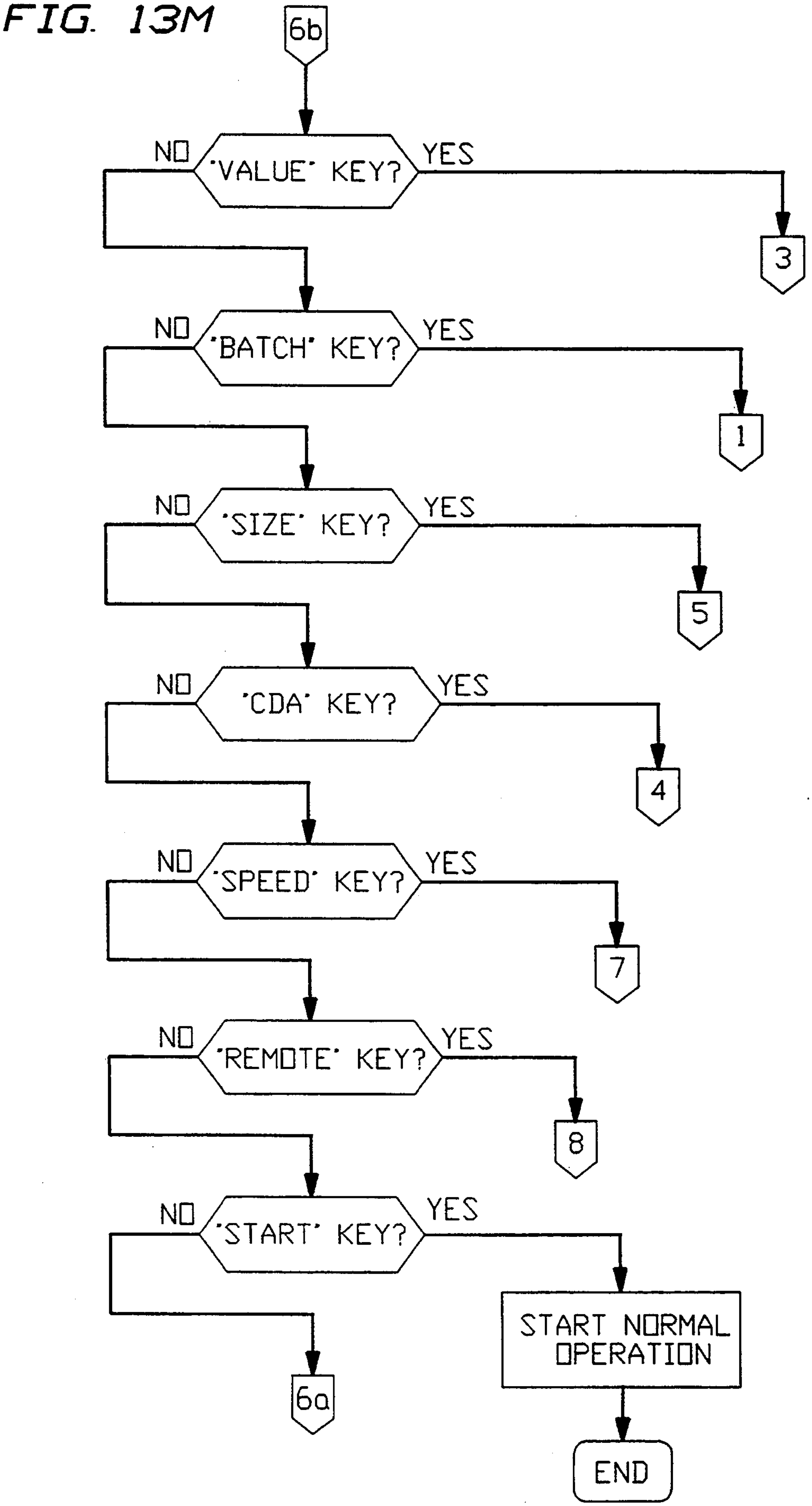
Figure 13N:
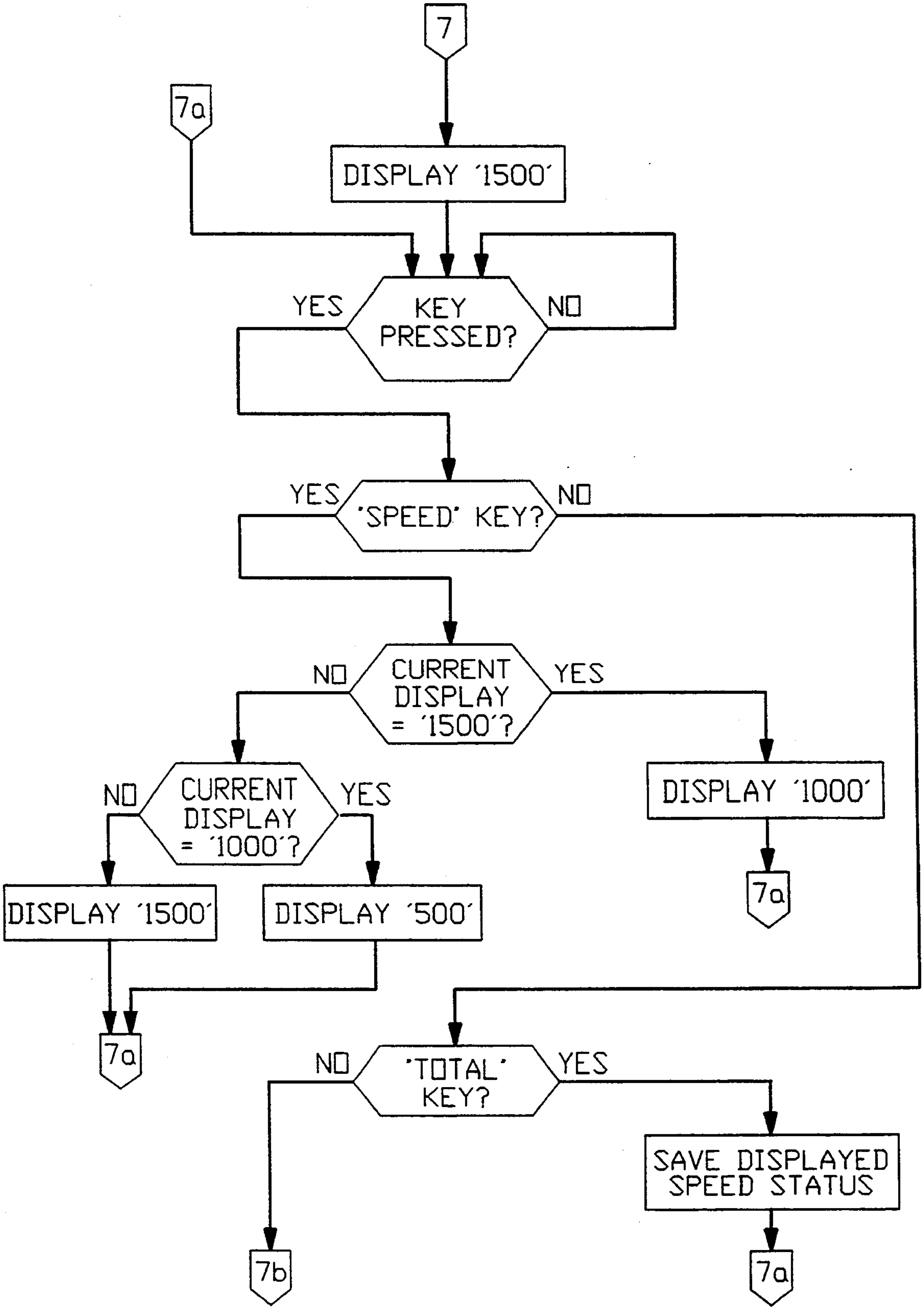
Figure 13O:
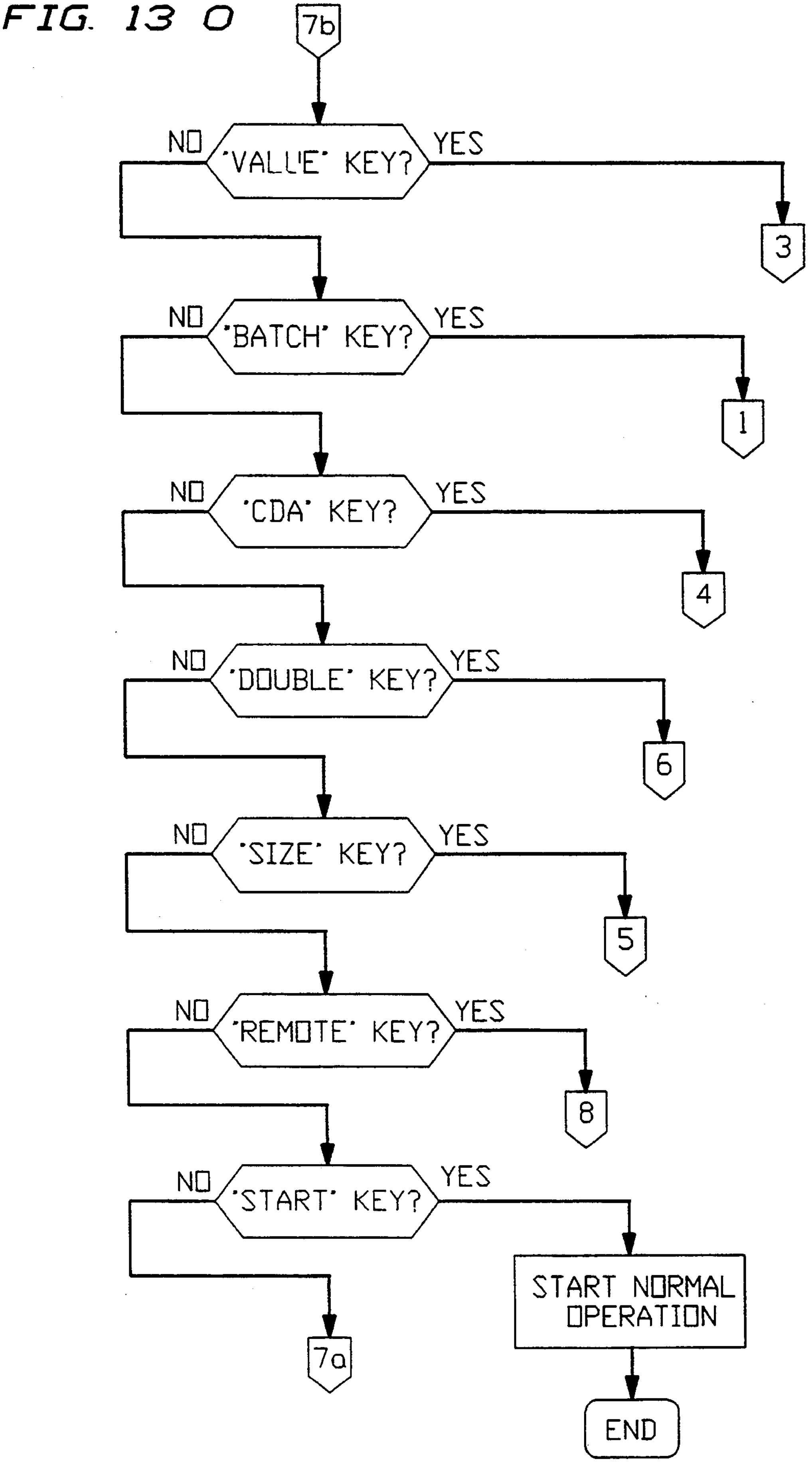

The operation of our system for "batch table", "denomination table", "CDA status", "remote mode status", "size detection status", "doubles status" and "speed status" programming will be evident from FIGS. 13B to 13O. As will be apparent from these flow charts, our system permits the users to preset the desired values into the "Batch Settings" table, the "Value Mode Denominations" table, the "Speed Settings" (notes per minute) table and to choose the detection features they would like to have active when the unit is turned on. Once set these features remain at those settings through repeated power ON/OFF cycles. If the user does not set values, they will remain at predetermined factory default values. Also they will be returned to factory default values whenever a master reset is performed by holding the "CLEAR" key down and powering up. Where the battery of a battery backup system becomes weak, all the programmable parameters return to the factory default settings.

Factory default settings for "BATCH" may be 5, 10, 20, 25, 50, 100. For value mode denominations, the default settings may be 1, 2, 5, 10, 20, 50, 100. For multiple note detection, the default setting is "ON" while for CDA detection, size detection and remote mode, the default setting is "OFF". For speed, the default setting is 1500, among choices of 1500, 1000 or 500 notes per minute.

To change any of the programmable features the "BATCH" key is held down during power up to initiate programming mode. Programming mode starts off with Batch value programming. If the programmer keeps pressing "BATCH" the unit displays the different Batch settings available in the table. These could be 5, 10, 20, 25, 50 and 100, for example. Any displayed value can be incremented or decremented by pressing "+" or "−" key. The programmer hits "TOTAL" key to choose the displayed value to be entered into the Batch Table. To clear any displayed value from the Batch Table the user presses "CLEAR" key. This way the user can go through all the slots available in the Batch Table and make sure correct numbers are entered. This process is cyclic and can be continued to go over the list of available values as many times as the programmer wishes. To continue to program any other feature, the programmer hits the key for that feature. For example, hitting "VALUE" key starts the programming for Value mode denominations. The process for choosing required denominations is similar to that for Batch values.

For programming various detection features (Counterfeit detection, for example), the user presses the key for that feature. Then that feature is turned "ON" i.e., rendered active. If the user wishes to deactivate it he/she should press the key for that feature again. When the desired state of the feature is reached, the user can move on to the next feature by pressing the key for the next feature. The active/inactive features selected in this way will remain in the selected states unless they are changed by the user during operation.

During the course of the programming mode, at any time the user can leave the programming mode and start normal operation by pressing the "START" key.

Figure 2:
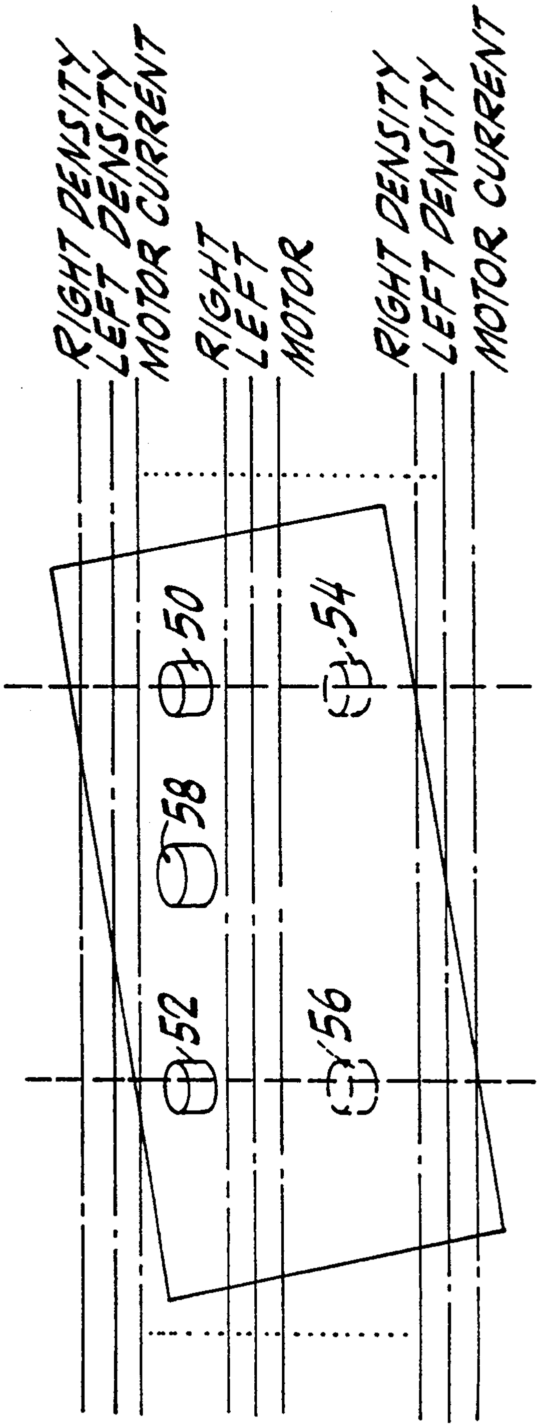
FIG. 2 is a diagrammatic view illustrating the relationship of a currency note to the sensing devices of the currency counter illustrated in FIG. 1.

In operation of our control system, as indicated by the horizontal lines in FIG. 2, periodic samples of density and motor current are taken. Based on the value of these samples, a determination is made of whether a single note, two notes, or more than two notes have been fed. Where only a single note has been fed, the count is increased by one. If the samples indicate that two notes have been fed, the count is increased by two and the unit continues to count. If more than two notes have been fed the unit stops counting and an error is indicated to the user.

Figure 15:
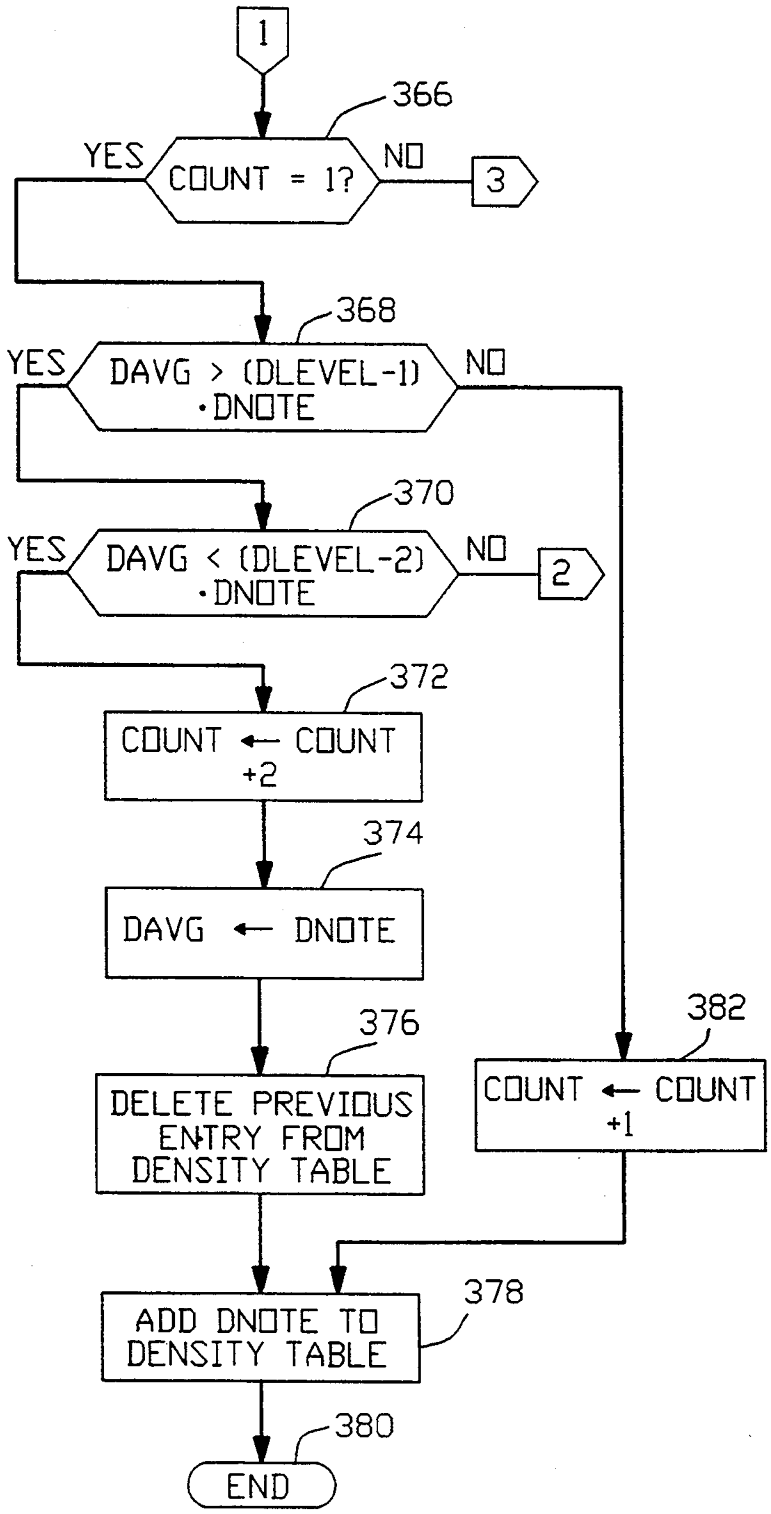
FIG. 15 is a flow chart illustrating another part of the multiple note detection operation in our control system.

In making the determination of how many notes are fed at a particular time, an optical density measurement is compared against the average density of the previous eight notes of the same pack or less than eight if the note happens to be one of the first eight notes run. It will be apparent that the first note of a pack is passed without error as there is no basis for comparison with a prior note. To correct this situation, the first note is compared against the second note of the stack as shown in FIG. 15. If the density and integrated motor current of the first note lie outside the accepted range with respect to the second note, an error is indicated to the user and the program ends as shown in FIG. 16.

The motor current samples are added together to provide an integrated motor current. For any particular note, this integrated motor current is compared with the average integrated currents for the four previous notes in determining if one, two, or more documents are being fed. It is to be noted that integrated motor current is not used as a decision factor for the first few notes of a run. The reason for this is that during the first few notes of an operation the motor will be just starting to gain speed and will be drawing a relatively high current.

Figure 16:
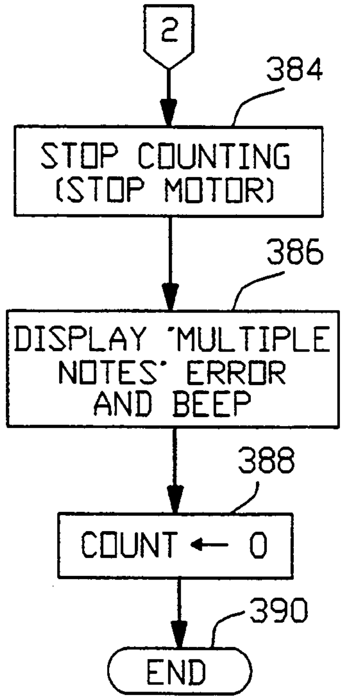
FIG. 16 is a flow chart illustrating a further portion of the multiple note detection operation in our control system.

Referring to FIGS. 14 to 16, the operation of multiple note detection is set forth using the following notations:

COUNT=the number of notes counted at any one time in a particular stack

Dnote=average density across the note.

Davg=density average of previous eight notes.

$Dlevel_1$=the factor by which Davg is multiplied to determine if there is only a single or more documents.

$Dlevel_2$=the factor by which Davg is multiplied to determine if there are two or more documents.

Mnote=integrated motor current for the present examination.

Mint=integrated motor current average of the four previous examinations.

$Mlevel_1$=the factor by which Mavg is multiplied to determine if one or more documents are being fed.

$Mlevel_2$=the factor by which Mavg is multiplied to determine if two or more documents are fed.

Referring now to FIG. 14, after starting the program at 340 a determination is made at 342 of whether or not the count is equal to zero. If the count is equal to zero, set Davg to Dnote at 344, set the COUNT to COUNT+1 at 346 and add Dnote to the density table at 348. The program may then end at 350.

If the determination at 342 is that the count is equal to zero, a determination is made of whether or not Dnote is greater than the product of $Dlevel_1$ and Davg. If so, the system proceeds to 354 to make a check of whether or not Dnote is less than the product of $Dlevel_2$ and Davg. If so, a check is made at 356 to see whether or not the count is greater than 2. If it is, a check is made at 358 of whether or not Mint is greater than the product of $Mlevel_2$ and Mavg. If so, at 360 another check is made to see if Mint is less than the product of $Mlevel_2$ and Mavg. If so, the COUNT is set to COUNT+2 at 362 and the program ends at 364.

Figure 17:
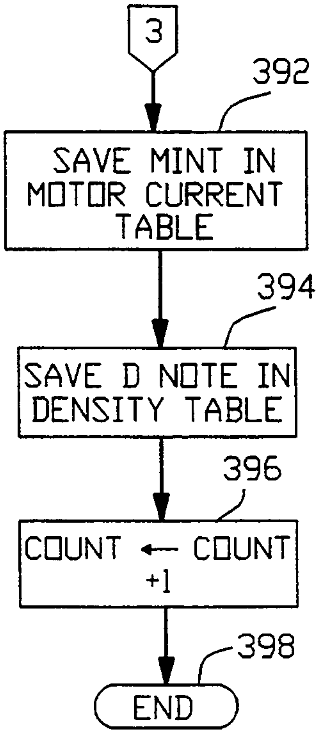
FIG. 17 is a flow chart illustrating the final Dart of the multiple note detection operation in our control system.

If the determination at 352 is that the average density across a note in the current measurement is not greater than the product of the factor $Dlevel_1$ and Davg, the system proceeds to "1" of FIG. 15. At 366 a determination is made to check if the count so far is equal to 1. If the answer is "no", it means that the current note is later than the second note in the stack. In such a case, the note is considered valid and the program proceeds to "3" as shown in FIG. 17. If the COUNT is equal to 1, a check is made at 368 to see whether Davg is greater than the product of $Dlevel_1$ and Dnote. If it is, the system proceeds to 370 to see whether or not Davg is less than the product of $Dlevel_2$ and Dnote. If so, COUNT is set to COUNT+2 at 374. Davg is set to Dnote at 374. The previous entry is deleted from the density table at 376 and Dnote is added to the density table at 378 and the program ends at 380. If the determination at 368 is no, then COUNT is set to COUNT+1 at 382 and the system proceeds to 378. If the comparison at any one of the blocks 354, 360 or 370 is negative, the system proceeds to "2" of FIG. 18 and the count is stopped by stopping the motor at 384. The display shows a "multiple notes" error and a beep sounds as indicated at 386. COUNT is set to zero at 388 and the program ends at 390.

Figure 19:
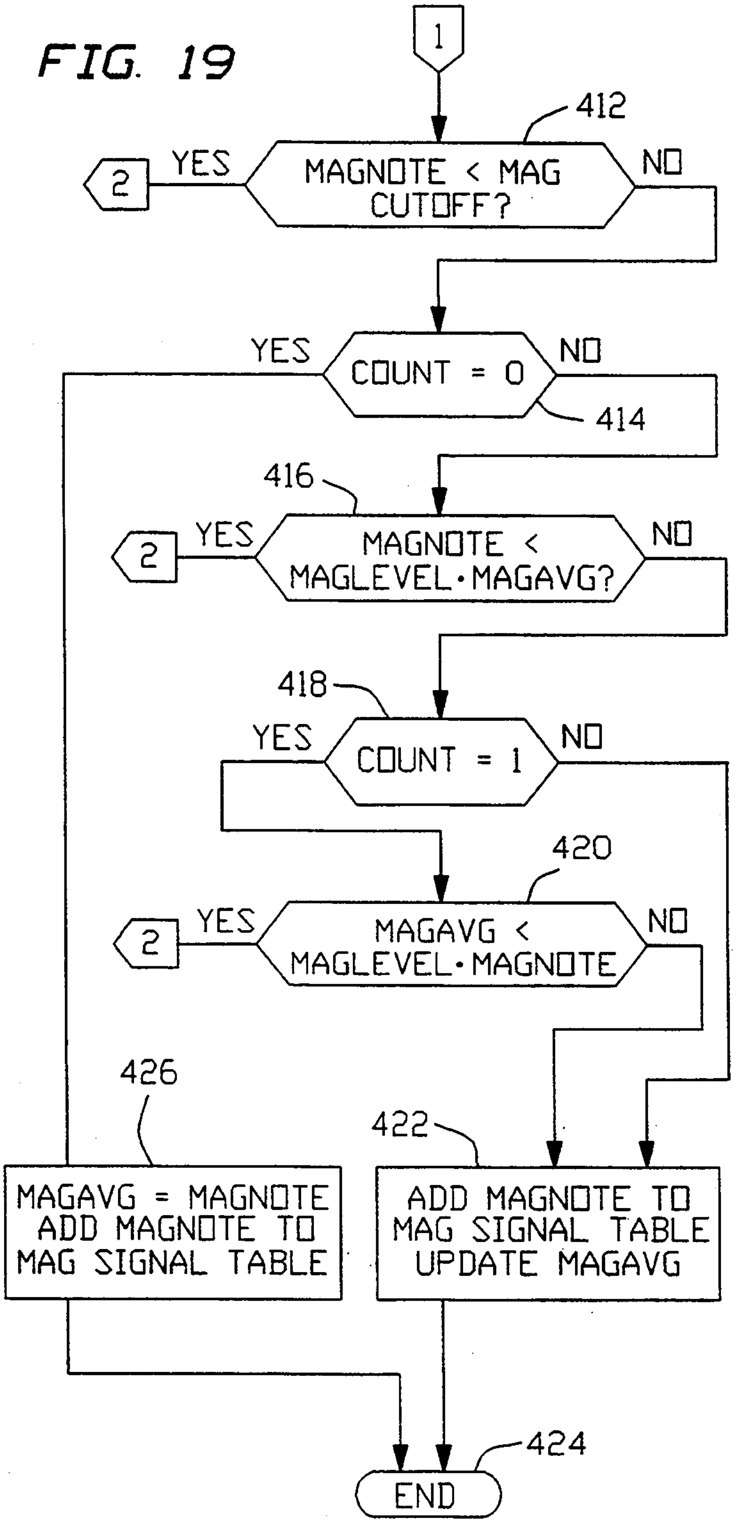
FIG. 19 is a flow chart illustrating a further portion of the counterfeit detection operation of our control system.

If the comparison at block 358 results in a negative, the system proceeds to "3" of FIG. 19 and Mint is saved in the motor current table as indicated at 392. Dnote is saved in the density table at 394. COUNT is set to COUNT+1 at 396 and the program ends at 398.

Our system also includes a means for detecting counterfeits on the basis of the amount of magnetic material present in the ink with which the note is printed. As has been pointed out hereinabove, in response to the passage of a note thereby head 58 produces an output signal in accordance with the amount of magnetic material in the ink with which the bill is printed. The circuit works as an integrator of the magnetic signal. As is the case with the other signals being read, we read the integrated signal using the analog to digital converter 200. The software also controls the switches that start and discharge the integrator.

Figure 20:
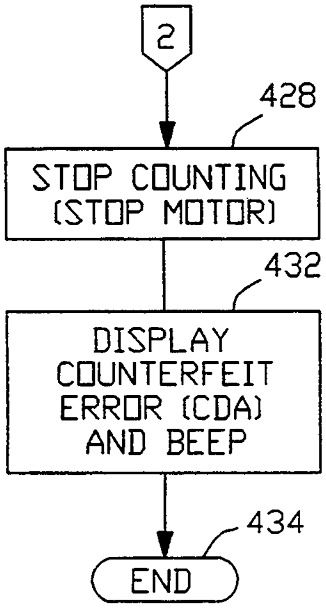
FIG. 20 is a flow chart illustrating another part of the counterfeit detection operation of our control system.
Figure 21:
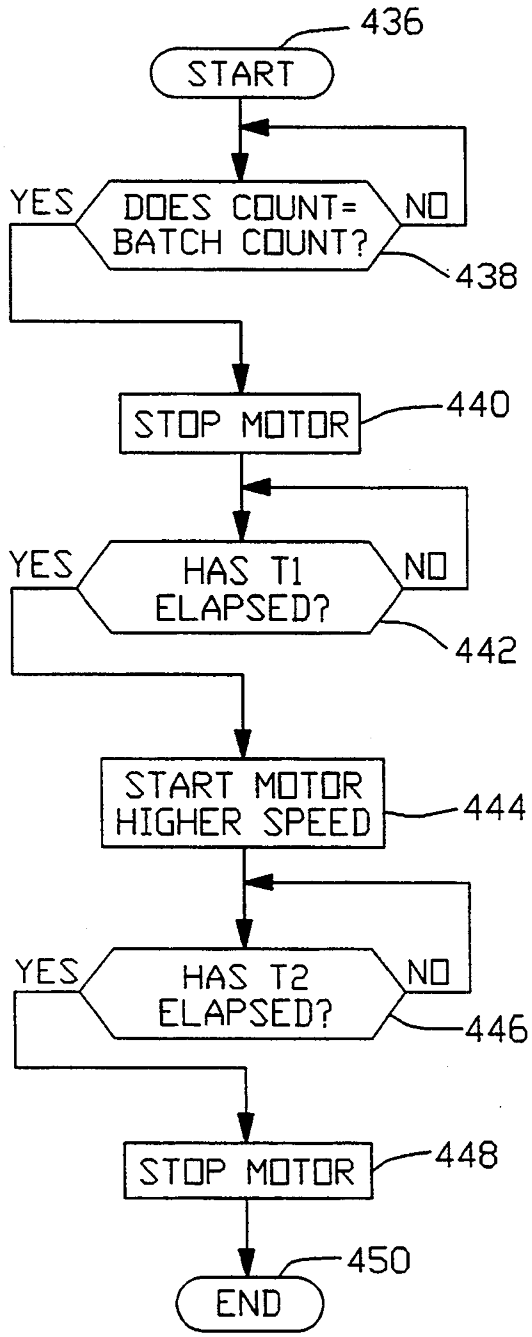
FIG. 21 is a flow chart illustrating the operation of our control system at the end of a slow speed hatching operation.

The working of our counterfeit detection system is illustrated in the flow charts of FIGS. 20 to 22. As will be apparent from the description given hereinbelow, the counterfeit detection is adaptive to the magnetic signal strength of the notes in any pack. Thus, if there are minor variations in signal strength from pack to pack the software is capable of adapting to it. In the flow charts, the following abbreviations are used:

MAGnote=magnetic signal strength of the note now being measured.

MAGavg=average of magnetic signal strength for the previous four notes.

MAGcutoff=signal strength below which a note is considered a suspect counterfeit irrespective of the signal strength of the other notes in the stack.

MAGlevel=the percentage of MAGavg below which the note under test is declared counterfeit suspect.

MAGoffset=the level of MAGnote that is obtained when no magnetic signal is detected.

Theoretically, the value of MAGoffset is zero, but some small nonzero value may be present due to system noise, parts value variations, etc. The value of MAGoffset is obtained by enabling the integrator stage of the CDA circuitry for a time equal to the nominal transit time of the document across the magnetic pick-up head, say 20 milliseconds. This is preferentially done while the motor is running at full speed and while no documents are being fed. At the end of this typical document time, the value of MAGnote is read at the analog-to-digital converter, and the integrator is then disabled. The value of MAGoffset is subtracted from all subsequent measured values of MAGnote before comparisons are made to determine the genuineness of the note.

Figure 18:
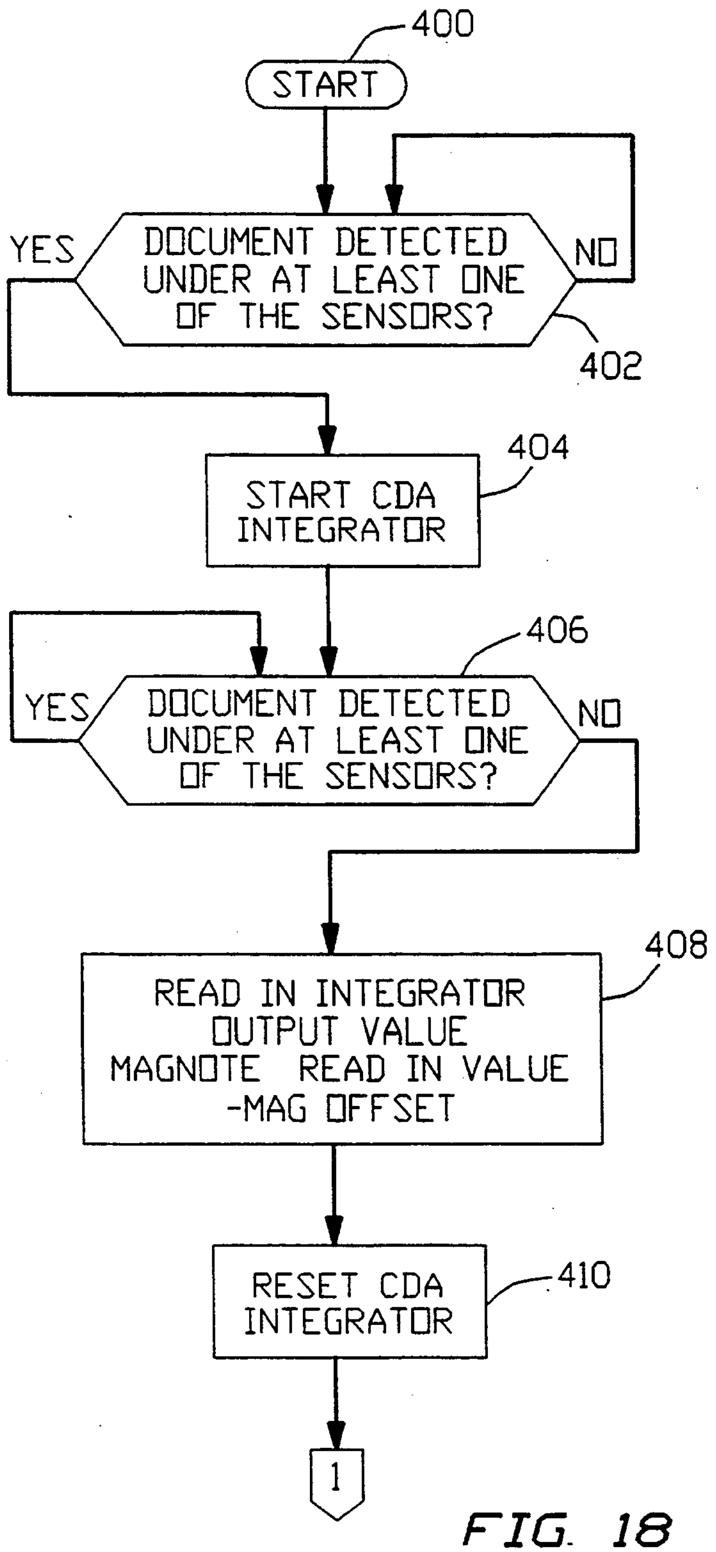
FIG. 18 is a flow chart showing the initial part of the counterfeit detection operation of our control system.

Referring to FIG. 18, after the start indicated at 400 of the counterfeit detection operation a determination is made at 402 of whether or not a document has been detected under at least one of the sensors. If not, the operation is repeated until a document is detected. At that point, the CDA integrator is started. Again, a check is made to see if a document has been detected under at least one of the sensors. If so, the operation is repeated until no document is detected. At that point, as indicated at 408, the integrator output value is read in and MAGnote is set to the read in value. Next, at 410 the CDA integrator is reset and the system proceeds to "1" of FIG. 21. Next, as indicated at 412, a check is made to see if MAGnote is less than MAGcutoff. If not, as indicated at 412, a check is made of whether or not COUNT is equal to zero. If not, as indicated at 416, a check is made to determine whether or not MAGnote is less than MAGlevel×MAGavg. If not, at 418 a determination is made of whether or not COUNT is equal to 1. If so, a determination is then made at 420 of whether or not MAGavg is less than the product of MAGlevel and MAGnote.

If the determination at either 418 or 420 is in the negative, the system proceeds to 422 at which MAGnote is added to the MAG signal table and MAGavg is updated to end the program at 424.

If, at 414, COUNT has been determined to be zero, the system goes to 426 whereat MAGavg is set to MAGnote and MAGnote is added to MAG signal table and the program ends at 424.

If the determination at any of 412, 416 or 420 is in the affirmative, the program continues to "2" of FIG. 20. Counting is stopped by stopping the motor at 428 and at 432 the counterfeit error (CDA) is displayed and a beep is sounded and the program ends at 434.

As will be apparent from the description given hereinabove, the machine 10 to which our control system is applied is capable of a hatching operation in which a predetermined number of notes from the supply are fed through the machine to the output tray 40. At the end of the count equal to the batch count, the motor is stopped.

A batching operation may, in some instances, be carried out at a relatively slow speed. This would happen, for example, where the machine operator desires to observe each note as it is fed to the output tray so as, for example, to determine the presence of a five dollar note among an input stack of one dollar notes.

Under the conditions described above wherein a batch counting operation is conducted at slow speed, it may be that a note which has entered the feed path and thus been counted is not delivered to the stacker tray 40 before the motor 138 stops. We provide an arrangement for obviating this possibility by starting the motor 138 at a higher speed for a short period of time after it has been stopped following a batching operation. The "kick" given the motor is sufficient to cause the stacker wheels 36 to deliver the note to the output tray but is not sufficient to cause another note to be driven into the feed path.

Referring now to FIG. 23, we have shown the operation of our control system in ensuring that the last note of a batch reaches the output tray at the end of a batch count. From a start at 436, a determination is made at 438 of whether or not the count is equal to the batch count. If "no", operation continues until the count equals the batch count at which time the motor is stopped, as indicated at 440. Next, a check is made at 442 to determine whether or not a first time period T1 has elapsed. When it has, the motor is started again at higher speed as indicated at 444. After a second predetermined time delay indicated by 446, the motor is stopped at 448 and the program ends at 450.

The gain of the transimpedance amplifier 80 is determined by the sum of the resistance of resistor 82 and internal resistance between terminals VA and OUTA of DAC 84. The magnitude of the internal resistance is determined by the digital input to DAC 84 at D1–D8.

To precalibrate the front-end analog circuit, the DAC 84 is preloaded with increasing values while comparing the output as sampled by ADC 200 with the value stored in SRAM 210. To recalibrate, the analog signal from 94 is fed to the ADC 200 of the control system and compared with the stored value.

When the KIO chip puts out AD SW RIGHT and AD SW CAL switch 122 closes and opens to cause a signal which is a predetermined percentage of the density signal to be fed to ADC 200 at VIN POS on line 158 from buffer amplifier 94 while VREF/2 is set to a fixed 50% of supply by equal resistors 128 and 130. The digital value is compared with the stored and updated calibration information to determine the state of calibration.

It is to be noted that during calibration, transistor 118 is turned on to prevent LED boost "I" mode.

By not implementing the AD SW CALIP you close switch 126 and change the scaling of the ADC VIN POS input. Under this condition the chip 238 puts out only the AD SW RIGHT signal, switch 122 closes to send a present sample of the right density document signal to the ADC 200 for doubles and triples information. The resultant signal is stored. This occurs approximately 100 times for each bill.

When the KIO chip 240 puts out AD SW CDA, switch 156 closes to send a signal from amplifier 154 to the VIN POS terminal Of ADC 200. This signal is a measure of the integrated magnetic value of the last document. The resultant digital value is compared to the previously stored values to adaptively decide on the probability of a suspect note.

When the chip 238 puts out AD SW MOTI, switch 148 closes to couple the signal from amplifier 146 to the ADC 200 on line 158. This signal is an analog of the amplified motor current. It is digitized by converter 200 and compared to the previously stored values to adaptively decide on the probability of a suspect note.

The operation of our improved control circuit will be apparent from the description hereinabove and particularly the flow chart set forth in FIGS. 12 through 21.

It will be seen that we have accomplished the objects of our invention. We have provided an improved control circuit for a currency counter which provides for automatic calibration of the photoelectric sensor pairs. Our control circuit provides more accurate doubles detection than is possible with systems of the prior art. Our doubles detection system is more convenient to the operator in use. Our control system incorporates an improved counterfeit detection arrangement in that no adjustment is necessary to account for differences in component characteristics from unit to unit, magnetic ink, or for different denominations, or from batch to batch. Our control system incorporates a speed control arrangement which will count a predetermined number of documents per minute. Our control system ensures that the last note is fully delivered to the output tray in slow speed batch counting operation.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Document handling apparatus including in combination energizable means for advancing documents along a path, detecting means including a variable gain amplifier, means positioning said detecting means in operative relationship to said path whereby said amplifier puts out a signal of a first magnitude in response to the presence of a document adjacent to the detecting means and of a second magnitude in the absence of a document adjacent to the detecting means, actuatable means for energizing said energizable means and means responsive to actuation of said actuatable means for automatically setting the gain of said amplifier to cause said second magnitude signal to assume a predetermined value, said gain setting means comprising means for storing a representation of gain, and means responsive to successive actuation of said actuatable means for updating said representation.

2. Apparatus as in claim 1 in which said storing means comprises a memory for storing a first digital representation, said means for updating said stored representation comprising means for sampling an output of said amplifier, means for converting said sampled output to a second digital representation, means for comparing said first and second digital representations and means responsive to said comparing means for updating said stored first digital representation.

3. Apparatus as in claim 1 in which said gain setting means comprises means for storing a digital representation of gain and a digital to analog converter responsive to said stored digital representation.

4. Apparatus as in claim 3 in which said updating means comprises means for sampling an output of said amplifier, an analog to digital converter for producing a digital representation of said output sample, means for comparing said sampled output digital representation with said stored representation and means responsive to said comparing means for updating said stored representation.

5. Apparatus as in claim 1 in which said energizable means comprises a motor, said apparatus including means responsive to said detecting means for producing a doubles signal indicating the apparent concomitant passage by said detecting means of more than one document, means for obtaining a motor current signal and means responsive the combination of to said doubles signal and a concomitant increase in said motor current signal for producing an indication of a double or overlapping feed.

6. Apparatus as in claim 5 including means responsive to said detecting means for producing a count of documents which have passed by said detecting means, means responsive to said detecting means for producing a length measurement in response to movement of a document past said detecting means, means for setting the speed of said motor to cause said counting means to count a predetermined number of documents per unit time and means responsive to said length measurement means for regulating said motor speed to maintain said number of counts per unit time constant.

7. Apparatus as in claim 6 in which said documents are currency notes printed at least in part with magnetic ink, said apparatus comprising magnetic detecting means adjacent to said path for producing a magnetic signal in response to the presence of magnetic material on a note passing by said detecting means, means for storing the average value of said magnetic signals corresponding to a plurality of notes which have traversed said path, means for comparing a subsequent magnetic signal produced by another note traversing said path after said plurality with said average value, and means responsive to said comparing means for indicating that said other note is spurious.

8. Apparatus as in claim 7 in which said energizable means comprises means for withdrawing notes one by one from a supply and advancing said notes to a delivery location, means at said delivery location for stacking notes and a common drive motor for said withdrawing and advancing means and said stacking means, said apparatus including means for counting notes withdrawn by said withdrawing and advancing means, means responsive to said counting means for deenergizing said motor when a batch of notes aggregating a predetermined number have been withdrawn from the supply and means for momentarily reenergizing said motor.

9. Apparatus as in claim 8 including an on/off switch for connecting said apparatus to a power source, usersettable means for setting said predetermined number, and a non-volatile memory for storing a digital representation of said number and for preserving said digital representation in the off position of said switch.

10. Sheet handling apparatus including in combination means including a motor for advancing sheets one at a time along a path, means located along said path for producing a first signal indicating an apparent overlapping passage thereby of more than one sheet, means for obtaining a second signal as a measure of a predetermined increase in motor current resulting from an overlapping sheet feed by said advancing means and means responsive to the concomitant presence of both of said first and second signals for producing an indication of a multiple or overlapping feed.

11. Apparatus as in claim 10 in which said first signal producing means comprises means affording a measure of the density of a sheet passing thereby.

12. Apparatus as in claim 11 in which said first signal producing means comprises a source of light on one side of said path and a light detector on the other side of said path.

13. Apparatus as in claim 10 in which said second signal producing means comprises means for periodically obtaining sample values of motor current and means for integrating said sample values.

14. Apparatus as in claim 10 including means adapted to be actuated to count said sheets, said means responsive to said first and second signals comprising producing a third signal upon the overlapping passage of two sheets past said first signal producing means and a fourth signal upon the overlapping passage of more than two sheets past said first signal producing means, means responsive to said third signal for actuating said counting means to increase its count by two and means responsive to said fourth signal for producing an error indication.

15. Apparatus for counting documents advanced from a supply of documents to a delivery location including in combination means for holding a supply of documents, means including a motor for withdrawing documents one by one from said supply and forwarding the documents to said delivery location, said motor having an electrical current therethrough, sensing means disposed adjacent to said path for producing a first signal representing the density of a document passing thereby, means responsive to said sensing means for counting the number of documents passing the sensing means, means for producing a second signal representing the current through said motor, means for storing a representation of the average density of a number of documents which have passed said sensing means, means for storing a representation of the average motor current during the passage of a number of documents, means for comparing said first signal with said average density representation times a first factor, means for comparing said stored density representation with said first signal times said first factor, means for actuating said counting means to add one to its count when said first signal is not greater than the stored density representation times said first factor and the stored representation is not greater than said first factor times said first signal, means for producing an error signal when said first signal is not less than said stored density representation times a second factor, means for comparing said second signal with said stored current representation times a factor, means for actuating said counting means to add one to its count when said first signal is greater than the stored density representation times said first factor and less than the stored density representation times said second factor and said second signal is not greater than said stored current representation times a third factor, means for actuating said counting means to add two to its count when said first signal is greater than the stored density representation times said first factor and less than said stored density representation times said second factor and said second signal is greater than the stored current representation times said third factor and less than said stored current representation times a fourth factor and means for producing an error signal when said first signal is greater than the stored density representation times said first factor, and second signal is greater than said stored representation times said third factor and said second signal is not less than said stored current representation times said fourth factor.

16. Apparatus as in claim 15 in which said first and third factors correspond to the movement of more than a single document at a time past said sensing means and said second and fourth factors correspond to the movement of more than two documents at a time past said sensing means.

17. Sheet handling apparatus including in combination means including a motor for advancing sheets along a path, detecting means responsive to movement of sheets along said path, first means responsive to said detecting means for producing a count in response to movement of a sheet past said detecting means, second means responsive to said detecting means for producing a length measurement in response to movement of a sheet past said detecting means, means for setting the speed of said motor to cause said counting means to count a predetermined number of sheets per unit time and means responsive to said length measurement means for regulating said motor speed to maintain said number of counts per unit time constant.

18. Apparatus as in claim 17 in which said means responsive to said length measurement means increases said motor current in response to an increase in said length measurement and decreases said motor current in response to a decrease in said length measurement.

19. Apparatus as in claim 17 in which said means responsive to said length measurement includes a timer, means responsive to said detecting means for actuating said timer to measure the time for producing a predetermined count, means for comparing said measured time with maximum and minimum time limits, and means for comparing said length measurement with maximum and minimum measurement.

20. Apparatus as in claim 19 in which said means responsive to said length measurement includes means responsive to said comparing means for decreasing motor speed when said measured time is less than the minimum time and the length measurement is greater than the minimum length and means for increasing motor speed when the measured time is greater than the maximum time and the measured length is less than the maximum length.

21. Apparatus as in claim 17 in which said means responsive to said length measurement includes a timer, means responsive to said detecting means for activating said timer after the passage by said detecting means of a predetermined number of sheets, means responsive to said detecting means for deactivating said timer after the passage by said detecting means of a second number of sheets to measure the time for said second number of sheets to pass the detecting means.

22. Apparatus for counting documents from a supply and for delivering said documents to a delivery location including in combination means for holding a supply of documents, means for withdrawing documents one by one from said supply and advancing said documents toward said delivery location, means at said delivery location for stacking documents received from said advancing means, means including a common motor for driving said withdrawing and advancing means and said stacking means, means for counting documents withdrawn by said withdrawing and advancing means, means for energizing said motor, means responsive to said counting means for deenergizing said motor when a batch of documents aggregating a predetermined number have been withdrawn from said supply and means for momentarily reenergizing said motor after the deenergizing thereof to ensure that the last document of said batch withdrawn from said supply is moved to said delivery location by said stacking means.

23. Apparatus as in claim 22 in which said means for energizing said motor energizes said motor to run at a first speed and in which said means for reenergizing said motor energizes said motor to run at a speed which is higher than said first speed.

24. Apparatus as in claim 23 in which said motor is reenergized for such a time and at such a speed as to ensure that said stacking means stacks the last document of said batch and that said withdrawing means withdraws no additional documents from said supply.

* * * * *

UNITED STATES PATENT AND TRADEMARK OFFICE
CERTIFICATE OF CORRECTION

PATENT NO. : 5,341,408

DATED : August 23, 1994

INVENTOR(S) : Richard A. Melcher, William Sherman III, Madhura Nadig, Robert M. Stewart, Paul L. Hessler, David R. Bryce It is certified that error appears in the above-identified patent and that said Letters Patent is hereby corrected as shown below:

On the Title Page, item [54], "CURRENTY" should read -- CURRENCY --.

Column 13, line 49, delete "the combination of", after "to" insert --the combination of--.

Signed and Sealed this

Sixth Day of December, 1994

Attest:

BRUCE LEHMAN

Attesting Officer

*Commissioner of Patents and Trademarks*